US010750005B2

(12) United States Patent
Keen et al.

(10) Patent No.: US 10,750,005 B2
(45) Date of Patent: Aug. 18, 2020

(54) SELECTIVE EMAIL NARRATION SYSTEM

(71) Applicant: International Business Machines Corporation, Armonk, NY (US)

(72) Inventors: Martin G. Keen, Cary, NC (US); Richard D. Johnson, Raleigh, NC (US); Hernan A. Cunico, Holly Springs, NC (US); Paul A. R. Frank, Hamburg (DE)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 16/144,060

(22) Filed: Sep. 27, 2018

(65) Prior Publication Data

US 2020/0106876 A1    Apr. 2, 2020

(51) Int. Cl.
*G06F 15/16* (2006.01)
*H04M 1/725* (2006.01)
*H04L 12/58* (2006.01)
*H04W 4/12* (2009.01)
*G06Q 10/10* (2012.01)
*G06F 16/20* (2019.01)

(52) U.S. Cl.
CPC ........ *H04M 1/72552* (2013.01); *G06F 16/20* (2019.01); *G06Q 10/107* (2013.01); *H04L 51/063* (2013.01); *H04L 51/22* (2013.01); *H04L 51/26* (2013.01); *H04W 4/12* (2013.01)

(58) Field of Classification Search
CPC ....... H04L 51/26; H04L 51/063; H04L 51/22; G06Q 10/107; G06F 16/20; H04W 4/12; H04M 1/72552
See application file for complete search history.

(56) References Cited

U.S. PATENT DOCUMENTS

| | | | |
|---|---|---|---|
| 7,178,099 B2 | 2/2007 | Meyer et al. | |
| 9,381,813 B2 | 7/2016 | Hamiholi et al. | |
| 9,591,117 B1* | 3/2017 | Toren | H04W 4/14 |
| 10,559,297 B2* | 2/2020 | Harris | G10L 25/87 |
| 2005/0058260 A1 | 3/2005 | Lasensky et al. | |
| 2006/0168006 A1 | 7/2006 | Shannon | |
| 2015/0266377 A1 | 9/2015 | Hampiholi et al. | |
| 2016/0379463 A1 | 12/2016 | Agrawal et al. | |
| 2017/0353840 A1 | 12/2017 | Bostick et al. | |
| 2018/0143801 A1* | 5/2018 | Stucker | G06F 3/167 |

* cited by examiner

*Primary Examiner* — Cheikh T Ndiaye
(74) *Attorney, Agent, or Firm* — Stephen R. Yoder

(57) ABSTRACT

In an approach to narrating an email message based on the significance of the recipients on the message, identifying an email message; identifying recipients of the email message; identifying a client recipient from the recipients; selecting a first recipient from the recipients; identifying messages in an email repository; determining, from among the identified messages, a first count of messages; identifying an important recipient threshold, wherein the important recipient threshold represents a threshold count of messages; in response to determining the first count of messages exceeds the important recipient threshold, assigning a high importance recipient rating to the first recipient; creating a narration script; and in response to identifying the first recipient as having the high importance recipient rating, populating the narration script with a name of the first recipient such that the name of the first recipient will be read when the narration script is recited.

20 Claims, 9 Drawing Sheets

SELECTIVE EMAIL NARRATION SYSTEM

BACKGROUND

The present invention relates generally to the field of communications, and more particularly, to a communication system for narrating a received message with significant recipients.

Hands-free is an adjective describing technology that can be used without the use of hands (for example via voice commands) or, in a wider sense, technology which needs only limited use of hands, or for which the controls are positioned so that the hands are able to occupy themselves with another task (such as driving) without needing to hunt far afield for the controls. Hands-free mobile phones are becoming increasingly popular, especially when multi-tasking such as driving a car. A digital assistant is a software agent that can perform tasks or services for an individual. Recently, the capabilities and usage of virtual assistants are expanding rapidly, with new products entering the market and a strong emphasis on voice user interfaces. Digital assistants increase hands-free technology usage and can facilitate tasks such as texting, making phone calls, taking photographs, uploading images, reading documents and information, and playing music.

Many digital assistants and smart devices utilize natural language processing to complete tasks. Natural language processing (NLP) is a field concerned with the interactions between computers and human (natural) languages. In particular, it helps computers understand, interpret and manipulate human language. NLP helps computers communicate with humans in their own language and scales other language-related tasks. For example, NLP makes it possible for computers to read text, hear speech, interpret it, measure sentiment and determine which parts are important.

SUMMARY

The present invention can be embodied as a method, a computer program product, and/or a computer system, as described herein. Aspects of the present invention comprise: identifying an email message; identifying a plurality of recipients of the email message; identifying a client recipient from the plurality of recipients; selecting a first recipient from the plurality of recipients, wherein the first recipient is a recipient other than the client recipient; identifying messages in an email repository, wherein the email repository is associated with the client recipient; determining, from among the identified messages, a first count of messages, wherein the first recipient is a party to the first count of messages; identifying an important recipient threshold, wherein the important recipient threshold represents a threshold count of messages including the plurality of recipients; in response to determining the first count of messages exceeds the important recipient threshold, assigning a high importance recipient rating to the first recipient; creating a narration script, wherein the narration script is associated with the email message; and in response to identifying the first recipient as having the high importance recipient rating, populating the narration script with a name of the first recipient such that the name of the first recipient will be read when the narration script is recited.

DETAILED DESCRIPTION

Figure 1:
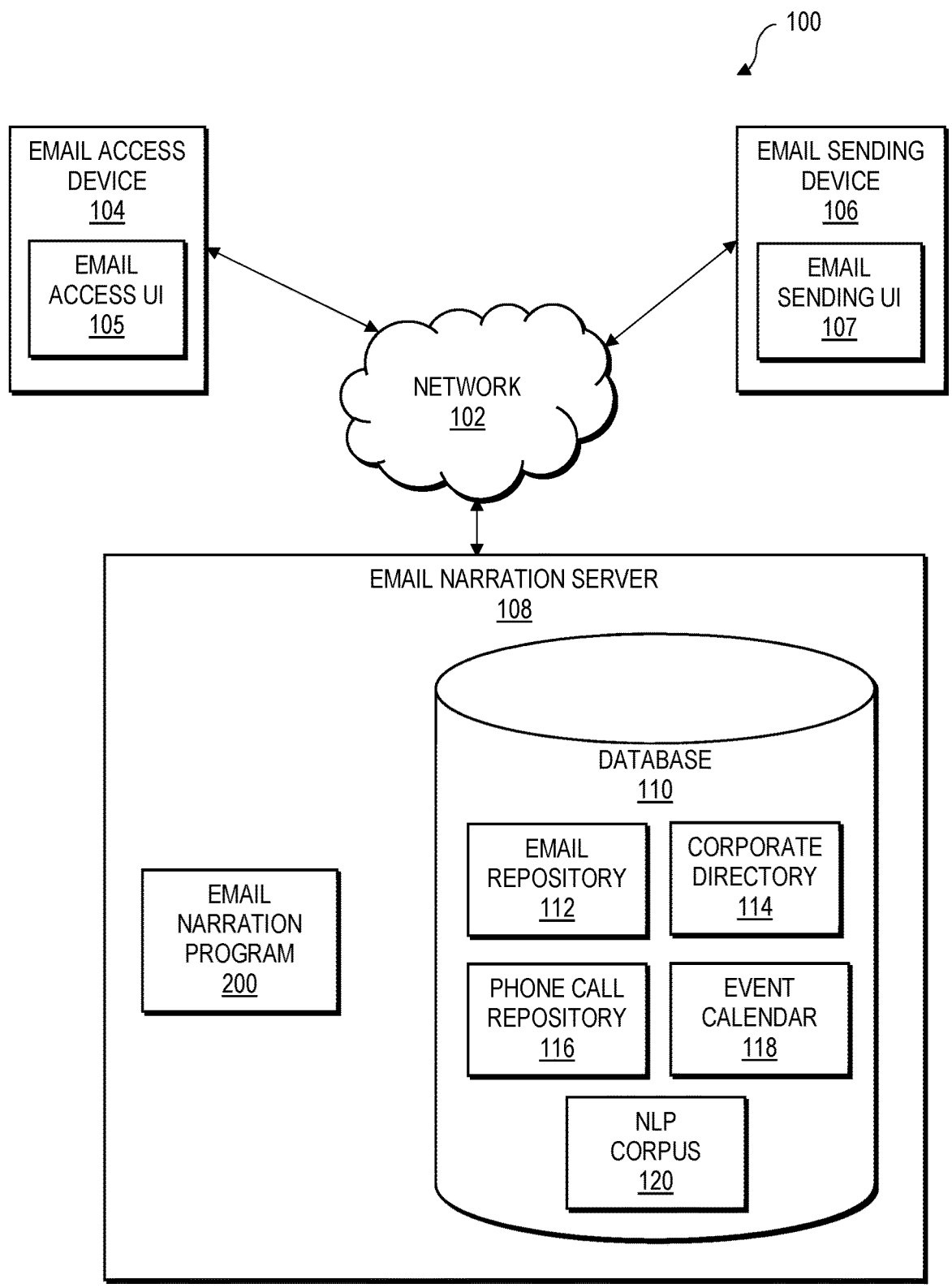
FIG. 1 is a functional block diagram illustrating a computing environment for narrating an email message based on the significance of the recipients on the message, in accordance with a first embodiment of the present invention.
Figure 2A:
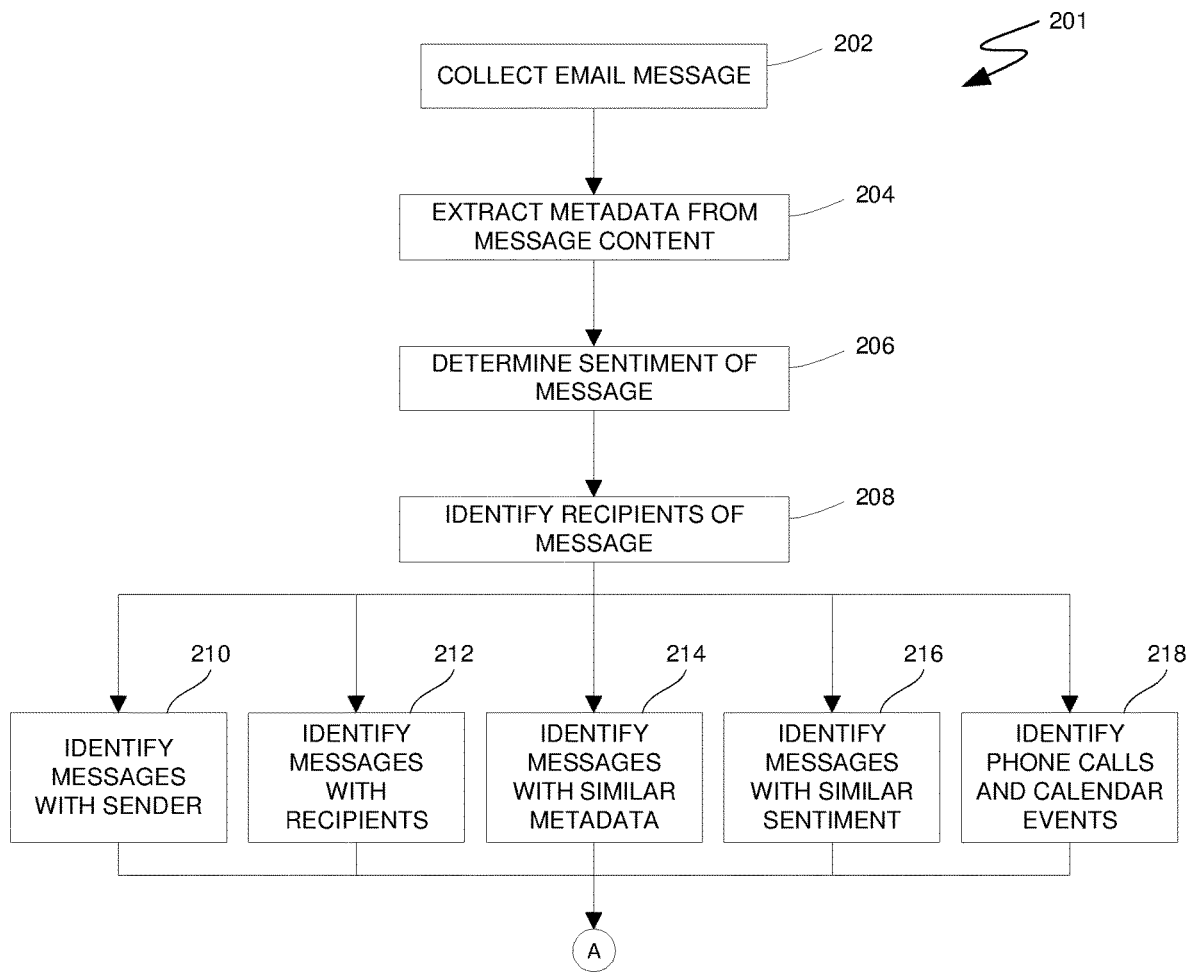
FIGS. 2A-2F are a flowchart depicting operations for narrating an email message based on the significance of the recipients on the message, on a computing device within the computing environment of FIG. 1, in accordance with an embodiment of the present invention.
Figure 2B:
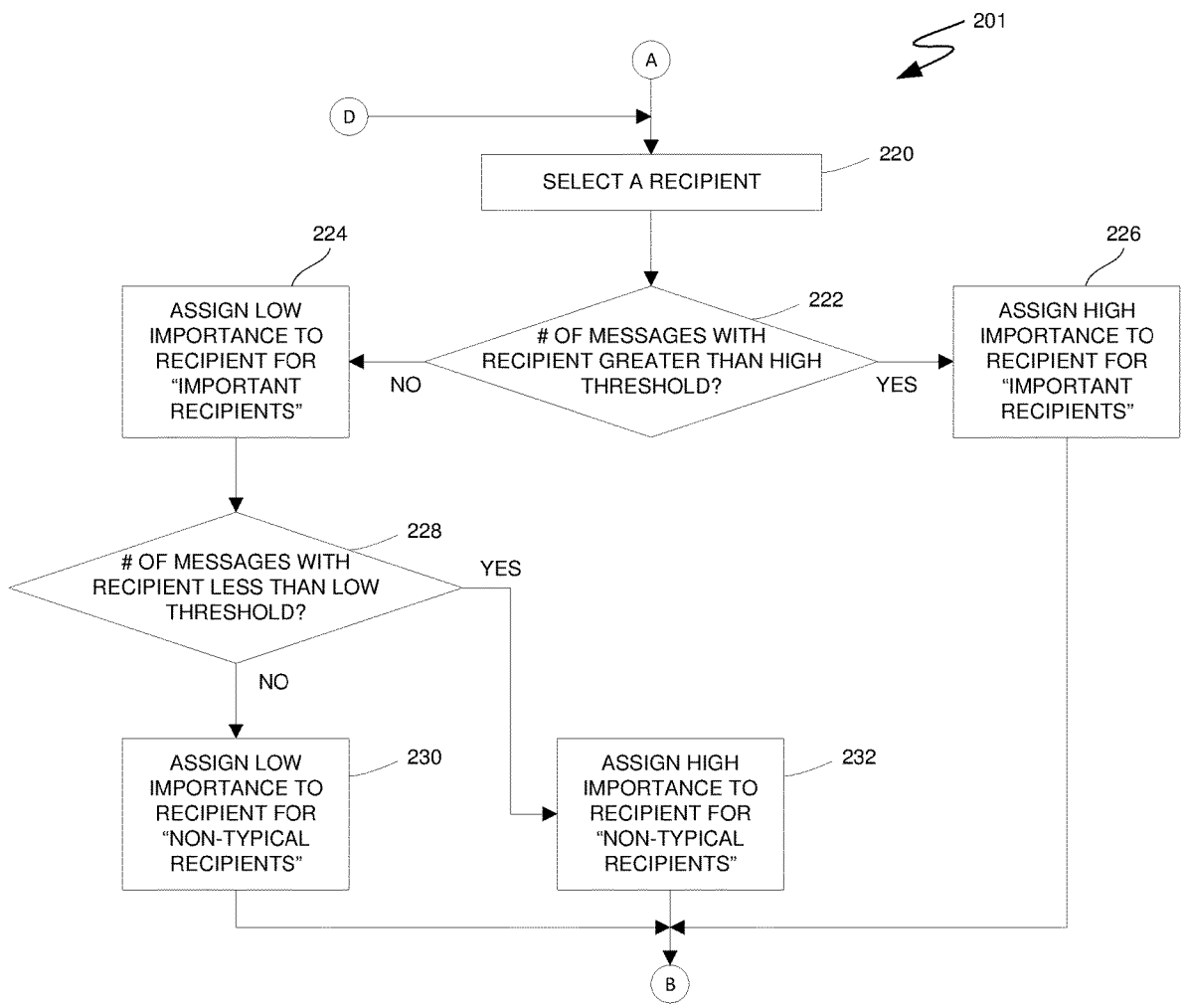
Figure 2C:
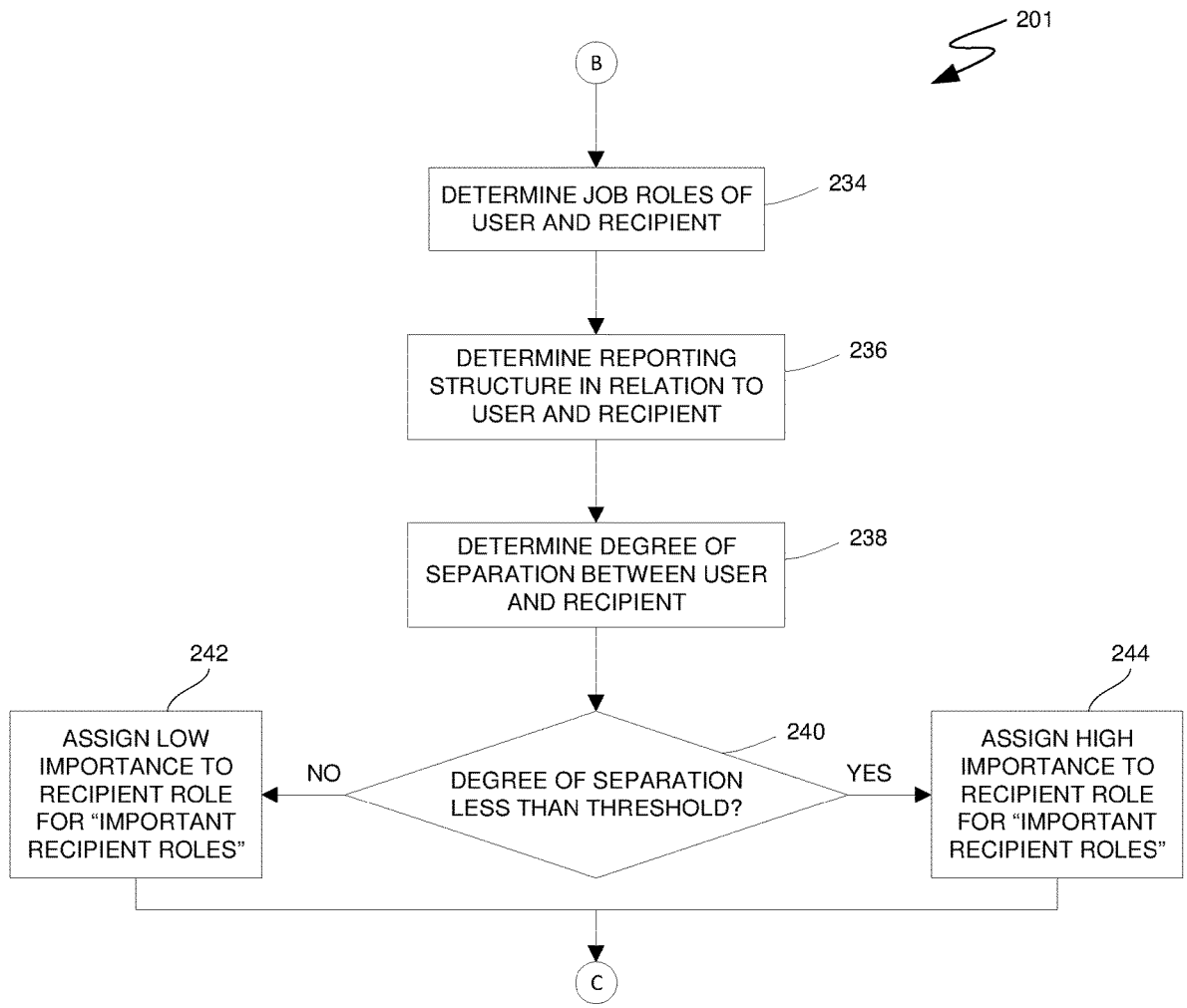
Figure 2D:
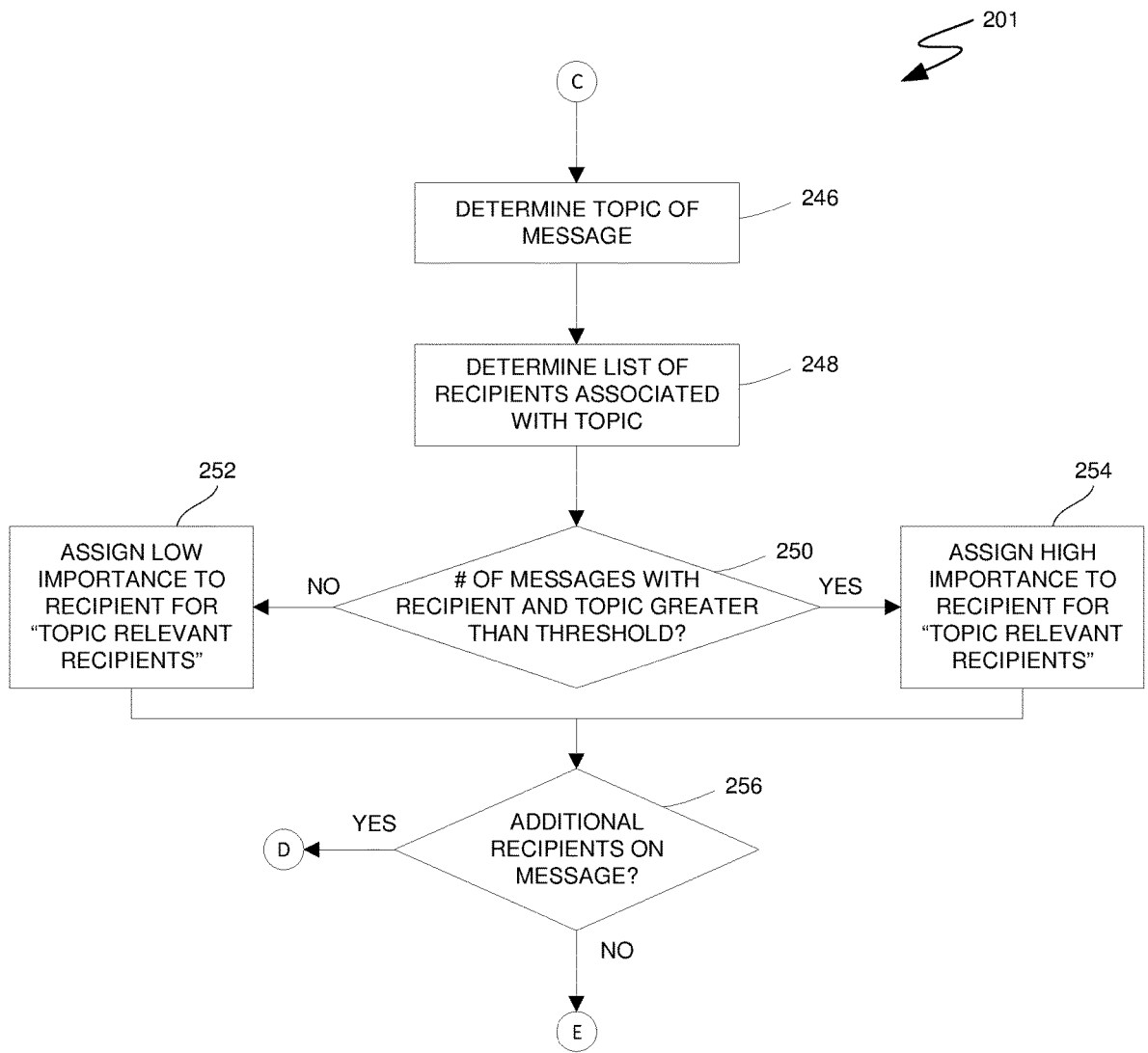
Figure 2E:
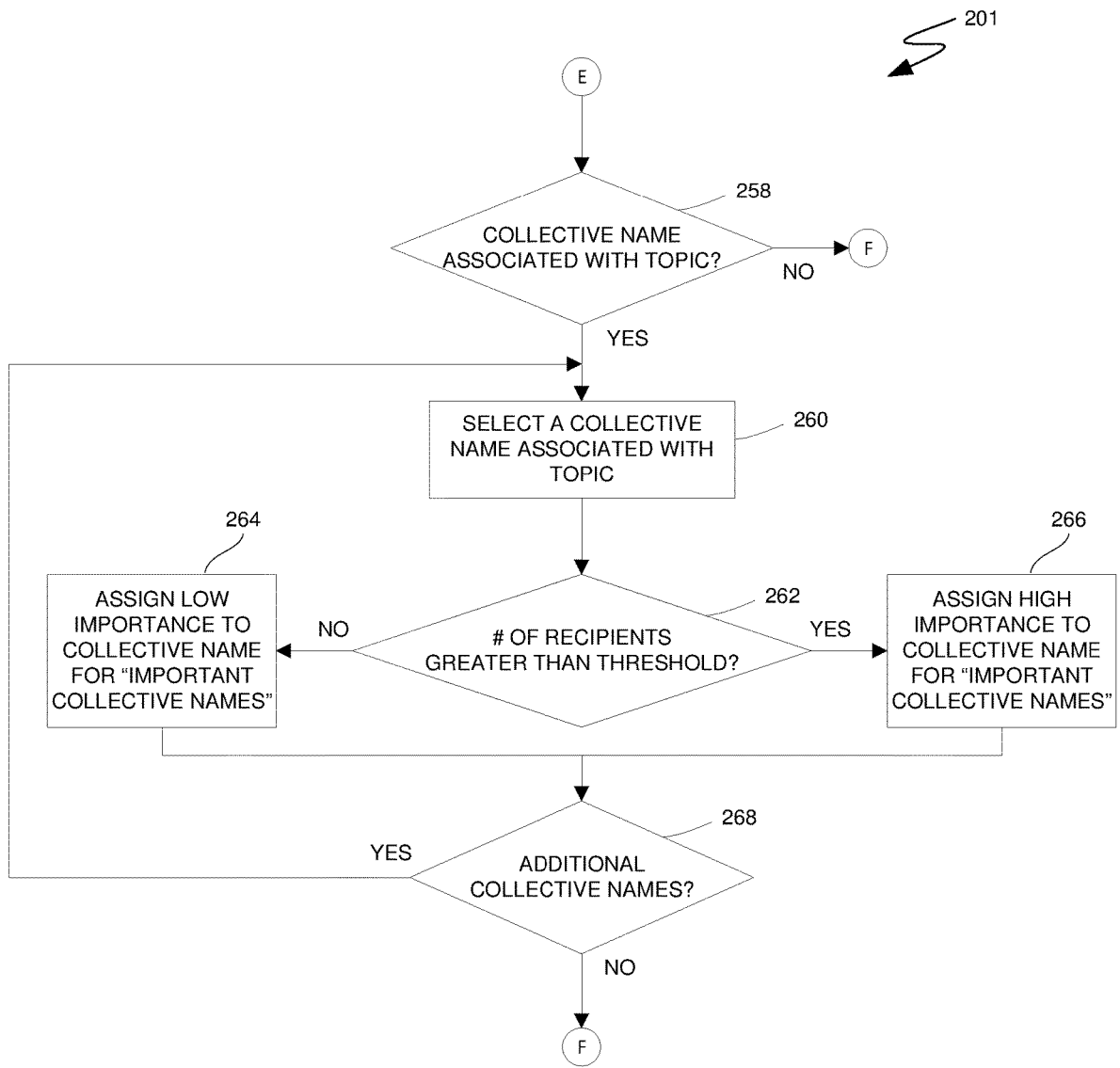
Figure 2F:
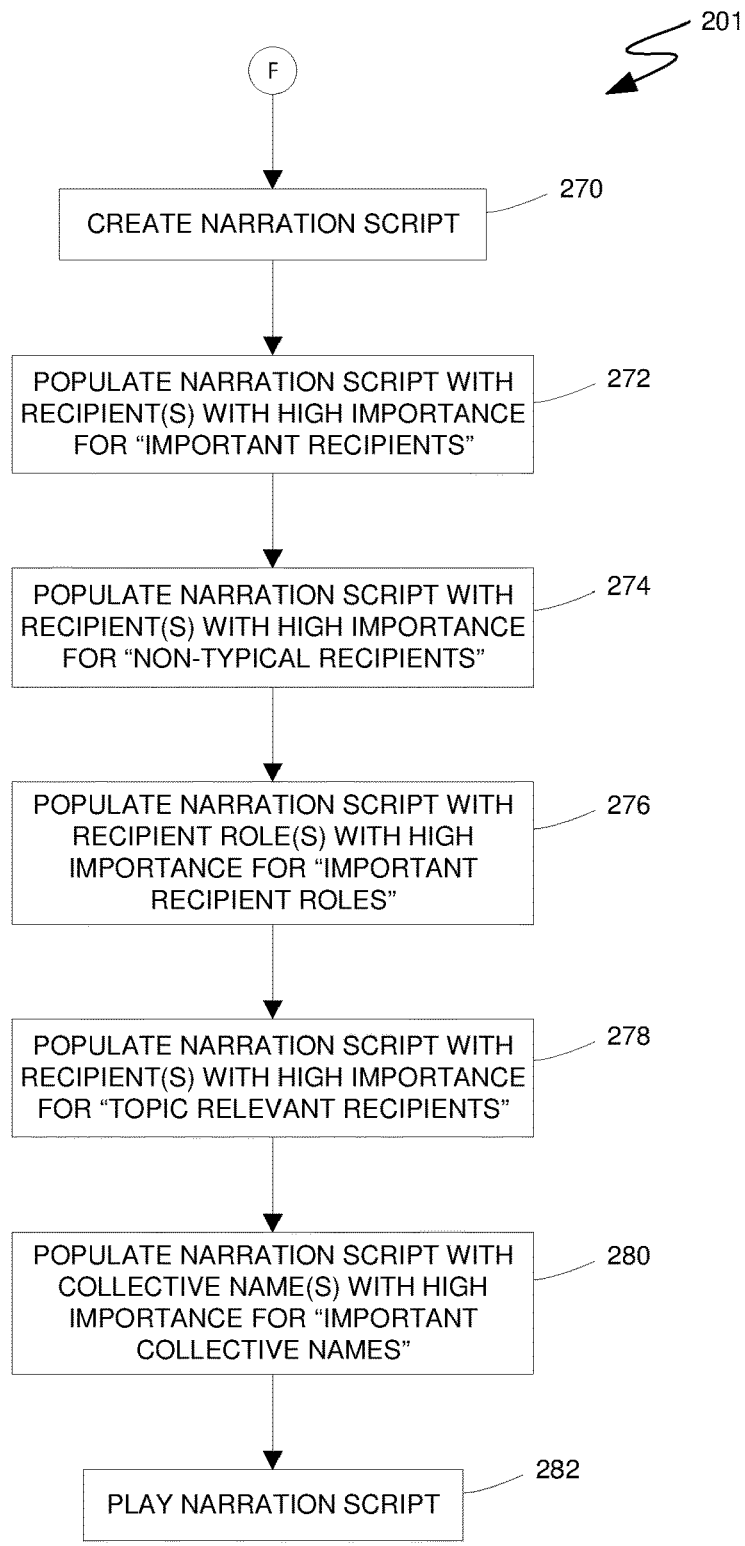

Embodiments of the present invention recognize in some situations, smart devices and digital assistants help with tasks that an individual would normally have to complete unassisted. One such task is reading information aloud for an individual. This is particularly useful when the individual is unable to look at the screen of the smart device, such as when driving, as well as offering accessibility advantages for visually challenged users. If an individual receives an email, a smart device may read the email message aloud for the individual. The narration of the email message played by the device would likely include the message content itself, as well as a description of when the message was sent and by whom. Other information that the device may narrate includes who the other recipients of the message were. In general, there are two methods to narrate an email message. One method is to not read aloud the recipients of the message for the sake of brevity. Another method is to read the full list of recipients. This second method may be long and tedious, particularly if that are many people listed as recipients of the message. For example, in a corporate environment, often emails are sent with many recipients. For example, a manager may send an email with an entire office copied on. A system that reads email aloud would either not read any recipient's name or read every single recipient's name, which may be rather time-consuming and unnecessary.

Embodiments of the present invention provide a method to narrate an email message based on the significance of the recipients. Through cognitive analysis of message recipients, the system can derive if recipients of the message are significant and should be read aloud and/or which subset of recipients should be included in the narration. For example, a user may want recipients who have rarely been included in past emails to be mentioned in the narration. In another example, a user may want the user's work managers to be mentioned in the narration. A user listening to a narration created by the system will only hear recipients read aloud when it is pertinent and only the recipient names, recipient job roles, and/or team names of significance will be read. A user may use past email history to allow the system to determine which recipients should be considered significant. For example, a system could determine that a recipient is copied in almost every email to the user and so could be important to the user. Phone call histories and calendar histories may be utilized by the system to make more accurate determinations on recipient significance. Additionally, if the user is in a corporate environment, the system may utilize corporate directories to get information on a recipient's relationship with the user for a more accurate determination of a recipient's significance.

Embodiments of the present invention will now be described in detail with reference to the Figures. It is to be understood that these embodiments are described only for the purpose of illustration and help those skilled in the art to understand and implement the present invention, without suggesting any limitation as to the scope of the invention. The invention described herein can be implemented in various manners other than the ones explicitly described herein.

FIG. 1 is a functional block diagram illustrating a computing environment, in accordance with an embodiment of the present invention. For example, FIG. 1 is a functional block diagram illustrating computing environment 100. Computing environment 100 includes email access device 104, email sending device 106, and email narration server 108 connected over network 102. Email access device 104 includes email access user interface (email access UI) 105. Email sending device 106 includes email sending user interface (email sending UI) 107. Email narration server 108 includes email narration program 200 and database 110. Database 110 includes email repository 112, corporate directory 114, phone call repository 116, event calendar 118, and natural language processing corpus (NLP corpus) 120.

In various embodiments, email narration server 108 is a computing device that can be a standalone device, a server, a laptop computer, a tablet computer, a netbook computer, a personal computer (PC), or a desktop computer. In another embodiment, email narration server 108 represents a computing system utilizing clustered computers and components to act as a single pool of seamless resources. In general, email narration server 108 can be any computing device or a combination of devices with access to some or all of email access device 104 and email sending device 106, and with access to and/or capable of executing email narration program 200. Email narration server 108 may include internal and external hardware components, as depicted and described in further detail with respect to FIG. 4.

In this embodiment, email narration program 200 is stored on email narration server 108. In other embodiments, email narration program 200 may reside on another computing device (e.g., email access device 104), provided it can access and/or receive data from some or all of email access device 104 and email sending device 106. In yet other embodiments, email narration program 200 may be stored externally and accessed through a communication network, such as network 102. Operations executed by email narration program 200 are discussed in greater detail with respect to FIGS. 2A-2F.

In general, email narration program 200 operates to narrate an email message based on the significance of the recipients on the message. A user of email narration program 200 uses a smart device, such as email access device 104, to select an email message to be narrated. Email narration program 200, using natural language processing, extracts metadata from the content of the message. In various embodiments, natural language processing involves converting chunks of text into more formal representations such as first-order logic structures that are easier for email narration program 200 to manipulate. Metadata that can be extracted from a message includes concepts, categories, entities, relations, semantic roles, and keywords. Email narration program 200, using natural language processing, can also determine sentiment and emotion in the message.

Email narration program 200 proceeds to identify the recipients of the message. Email narration program 200 determines the importance of these recipients in relation to the user. Email narration program 200 identifies messages found in the user's email, such as email repository 112, that may be relevant in importance determination. Email narration program 200 identifies messages with the same sender, messages with similar recipients, messages with similar metadata, and messages with similar sentiment/emotion. Email narration program also identifies relevant phone calls and calendar events belonging to the user, from phone call repository 116 and event calendar 118, respectively. Email narration program 200 selects one of the recipients from the email and determines whether the number of messages that include the selected recipient is greater than a threshold. For the case in which email narration program 200 determines there are more messages than the threshold, the recipient is assigned high importance. For the case in which email narration program 200 determines there are less messages than the threshold, the recipient is assigned low importance. If the recipient is assigned low importance, email narration program 200 determines whether the number of messages that include the selected recipient is less than a different threshold. For the case in which email narration program 200 determines there are less messages than the different threshold, the recipient is assigned high importance. For the case in which email narration program 200 determines there are more messages than the different threshold, the recipient is assigned low importance.

Email narration program 200 proceeds to determine the job roles, the reporting structure in relation to the user and the selected recipient, and the degree of separation between the user and the selected recipient. In some embodiments, email narration program 200 utilizes corporate directory 114 to determine these. Email narration program 200 determines whether the degree of separation between the user's job role and the selected recipient's job role is greater than a threshold. For the case in which email narration program 200 determines the degree of separation is greater than the threshold, the recipient role is assigned high importance. For the case in which email narration program 200 determines the degree of separation is less than the threshold, the recipient role is assigned low importance.

Email narration program 200 proceeds to determine the topic of the message using natural language processing techniques. Having determined the topic, email narration program 200 determines the list of recipients associated with the topic. Email narration program 200 determines whether the number of messages that includes the selected recipient and the topic is greater than a threshold. For the case in which email narration program 200 determines the number of messages is greater than the threshold, the recipient is assigned high importance. For the case in which email narration program 200 determines the number of messages is less than the threshold, the recipient is assigned low importance.

If no other recipients on the message have not been selected, email narration program 200 determines if a collective name is associated with the topic. In various embodiments, a collective name is a name of a group of individuals. The individuals may be recipients all associated with a topic. Email narration program 200 selects a collective name and determines if the number of recipients on the collected message associated with the collective name is greater than a threshold. For the case in which email narration program 200 determines the number of recipients on the message is greater than the threshold, the collective name is assigned high importance. For the case in which email narration program 200 determines the number of recipients on the message is less than the threshold, the collective name is assigned low importance.

If no other collective names on the message have not been selected, email narration program 200 creates the narration script. The narration script may include the sender's name, the date/time of the message, the subject, the message content, and the important recipients/recipient roles/collective names. Email narration program 200 populates the narration script with the important recipients/recipient roles/collective names that were assigned high importance. After completing the narration script, email narration program 200 plays the narration script for the user.

Database 110 is a data repository that may be written to and read by email narration program 200. Emails, employee directory information, phone calls, event calendars, and natural language processing corpuses may be stored to database 110. In some embodiments, database 110 may be written to and read by programs and entities outside of computing environment 100 in order to populate the repository with emails, employee directory information, phone calls, event calendars, and natural language processing corpuses. Contents of database 110, including contents of email repository 112, corporate directory 114, phone call repository 116, event calendar 118, and NLP corpus 120, may be distributed among computing devices in FIG. 1.

Database 110 includes email repository 112, which can be accessed on database 110 by email access device 104 to collect and analyze email messages belonging to a user. Email repository 112 may contain emails from one or more email services associated with a user. A user of email access device 104 may link email services, such as a work email or a personal email, to email repository 112. Email repository 112 may be updated by the user of email access device 104 or any relevant third party, such as a teacher, a parent or guardian, a family member or friend of the user, or an employer of the user.

Database 110 includes corporate directory 114, which can be accessed on database 110 by email access device 104 to collect and analyze email recipients' job information. Job information includes job titles and reporting structures in relation to the job title, as well as teams, sub-groups, or collective group names within the directory. Corporate directory 114 may contain one or more directories associated with different recipients. A user of email access device 104 may link corporate directories to corporate directory 114. Corporate directory 114 may be updated by the user of email access device 104 or any relevant third party, such as a teacher, a parent or guardian, a family member or friend of the user, or an employer of the user.

Database 110 includes phone call repository 116, which can be accessed on database 110 by email access device 104 to collect and analyze phone call histories of a user. Phone call repository 116 may contain one or more associated with the user and different recipients. A user of email access device 104 may link phone information from phones belonging to the user, such as a personal mobile phone or an office telephone, to phone call repository 116. Phone call repository 116 may be updated by the user of email access device 104 or any relevant third party, such as a teacher, a parent or guardian, a family member or friend of the user, or an employer of the user.

Database 110 includes event calendar 118, which can be accessed on database 110 by email access device 104 to collect and analyze calendars and calendar information associated with a user. Event calendar 118 may contain one or more associated with the user and different recipients. A user of email access device 104 may link calendars associated with the user, such as social media calendars or business calendars, to event calendar 118. Calendar information may include business meetings, family events, community events, and/or personal/leisure activities. Event calendar 118 may be updated by the user of email access device 104 or any relevant third party, such as a teacher, a parent or guardian, a family member or friend of the user, or an employer of the user.

Database 110 includes natural language processing (NLP) corpus 120, which can be accessed on database 110 by email access device 104. NLP corpus 120 is a database of structured texts which can be used for natural language processing functions. NLP corpus 120 may contain lexicons of multiple languages and may contain lexical, syntactic, and semantic information related to structured texts. In some embodiments, NLP corpus 120 is open and growing based on new linguistic rules, such as differing sentence structures and ambiguity. A user of email access device 104 may link lexicons and/or third-party corpora to NLP corpus 120 to grow the corpus used by email narration program 200. NLP corpus 120 may be updated by the user of email access device 104 or any relevant third party, such as a teacher, a parent or guardian, a family member or friend of the user, or an employer of the user.

Network 102 can be, for example, a local area network (LAN), a wide area network (WAN) such as the Internet, or a combination of the two, and may include wired, wireless, fiber optic or any other connection known in the art. In general, network 102 can be any combination of connections and protocols that will support communications between email narration server 108, email access device 104, and email sending device 106, in accordance with a desired embodiment of the present invention.

In various embodiments, email access device 104 is a computing device that can be a standalone device, a server, a laptop computer, a tablet computer, a netbook computer, a personal computer (PC), a desktop computer, a personal digital assistant (PDA), a smart phone, a smart alarm clock, or any programmable electronic device capable of communicating with email narration server 108 via network 102. In another embodiment, email access device 104 represents a computing system utilizing clustered computers and components to act as a single pool of seamless resources. In general, email access device 104 can be any computing device or a combination of devices with access to email narration server 108, and with access to and/or capable of executing email narration program 200. In some embodiments, email access device 104 can communicate directly or indirectly with email sending device 106. In some embodiments, email access device 104 can play email narrations created by email narration program 200. Email access device 104 may include internal and external hardware components, as depicted/described in further detail with respect to FIG. 4.

Email access device 104 includes a user interface (UI), email access UI 105, which executes locally on email access device 104 and operates to provide a UI to a user of email access device 104. Email access UI 105 further operates to receive user input from a user via the provided user interface, thereby enabling the user to interact with email access device 104. In one embodiment, email access UI 105 provides a user interface enabling a user of email access device 104 to interact with email narration program 200 of email narration server 108 via network 102. In various examples, the user interacts with email narration program 200 in order to link email services, corporate directories, phone call histories, event calendars, and/or natural language corpora. In one embodiment, email access UI 105 is stored on email access device 104. In other embodiments, email access UI 105 is stored on another computing device (e.g., email narration server 108), provided email access UI 105 can access and is accessible by email access device 104 and email narration program 200.

Email sending device 106 is a computing device, in some embodiments similar to email access device 104, capable of communicating with email narration server 108 via network 102. In another embodiment, email sending device 106 represents a computing system utilizing clustered computers and components to act as a single pool of seamless resources. In general, email sending device 106 can be any computing device or a combination of devices with access to email narration server 108, and with access to and/or capable of executing email narration program 200. In one embodiment, a plurality of email sending devices exists, where each email sending device sends emails to an email access device (e.g., email access device 104) by email narration program 200. In some embodiments, email sending device 106 can communicate directly or indirectly with email access device 104. Email sending device 106 may include internal and external hardware components, as depicted/described in further detail with respect to FIG. 4.

Email sending device 106 includes a user interface (UI), email sending UI 107, which executes locally on email sending device 106 and operates to provide a UI to a user of email sending device 106. Email sending UI 107 further operates to receive interaction from a user via the provided user interface, thereby enabling the user to interact with email sending device 106. In one embodiment, email sending UI 107 provides a user interface enabling a user of email sending device 106 to interact with email narration program 200 of email narration server 108 via network 102. In various examples, a user of email sending device 106 interacts with email narration program 200 in order to send an email to a user of email access device 104. In one embodiment, email sending UI 107 is stored on email sending device 106. In other embodiments, email sending UI 107 is stored on another computing device (e.g., email narration server 108), provided email sending UI 107 can access and is accessible by at least email sending device 106 and email narration program 200. In general, computing environment 100 can included any number of email sending devices 106 that can interface with email narration program 200 and email access device 104, as described herein, without departing from the scope of the invention.

In different embodiments, email access device 104 sends emails to email sending device 106 and email sending device 106 access emails sent by email access device 104, with respect to different emails. In other embodiments, email access UI 105 provides a user interface enabling a user to send emails and email sending UI 107 provides a user interface enabling a user to access emails, with respect to different emails.

can be the sender of emails with respect to different emails and email sending device 106 can be accessor of emails FIGS. 2A-2F are a flowchart depicting operations for narrating an email message based on the significance of the recipients on the message, on a computing device within the computing environment of FIG. 1, in accordance with an embodiment of the present invention. For example, FIGS. 2A-2F are a flowchart depicting operations 201 of email narration program 200 on email narration server 108 within computing environment 100. In other examples, FIGS. 2A-2F are a flowchart depicting operations of email narration program 200 on email access device 104 within computing environment 100. In different embodiments, there are multiple variations of the order of the steps that may be applied. For example, in some embodiments, the order in which importance ratings are assigned may differ from the embodiment depicted in FIGS. 2A-2F. Additionally, in some embodiments, the narration script may be populated in a different order from the embodiment depicted in FIG. 2F. In some embodiments, operations in FIGS. 2A-2F can be conducted independent of some or all of one another. For example, operations of FIG. 2D can be independent of operation in FIGS. 2B, 2C, and/or 2E.

Email narration program 200 collects an email message for a user (step 202). In some embodiments, the email message is selected by the user to be narrated for the user by the system. The user selects a message via email access UI 105 on email access device 104 of FIG. 1. If multiple messages are selected by the user, email narration program 200 proceeds with each message individually. In other embodiments, email narration program 200 automatically selects an incoming message for the purpose of narrating the message for the user. For example, if a message is sent to a user, the email narration program 200 automatically collects the message and proceeds with future steps. In some embodiments, the message is sent in by a sender utilizing email sending UI 107 on email sending device 106.

Email narration program 200 extracts metadata from the content of the message (step 204). Email narration program 200 utilizes natural language processing to extract metadata from the unstructured text found in the message. Examples of metadata that can be extracted from a message includes concepts, categories, entities, relations, semantic roles, and keywords. Natural language processing involves converting chunks of text into more formal representations such as first-order logic structures that are easier for email narration program 200 to manipulate. Natural language processing may include natural language understanding which involves the identification of the intended semantic from the multiple possible semantics which can be derived from a natural language expression which may take the form of organized notations of natural language concepts. Natural language processing may also include but is not limited to named entity recognition, lexical semantics, topic segmentation/recognition, morphological segmentation, part-of-speech tagging, parsing, word segmentation, and terminology extraction. Named entity recognition is the determination of items in a stream of text map to proper names, such as people or places, and what the type of each such name is (e.g. person, location, organization). Lexical semantics is the determination of what the computational meaning of individual words are in context with the other words. Topic segmentation/recognition is the separation of a stream of text into segments each of which is devoted to a topic and identifies the topic of the segment. Morphological segmentation is the separation of words into individual morphemes to identify the class of the morphemes. Part-of-speech tagging is the determination of the part of speech for each word. Parsing is the determination of the parse tree (grammatical analysis) of a given sentence. There are two primary types of parsing: dependency parsing and constituency parsing. Dependency parsing focuses on the relationships between words in a sentence (marking things like primary objects and predicates), whereas constituency parsing focuses on building out the parse tree using a Probabilistic Context-Free Grammar (PCFG). Word segmentation is the separation of a chunk of continuous text into separate words. Terminology extraction is the extraction of relevant terms from a given corpus. In some embodiments, email narration program 200 utilizes NLP corpus 120 of FIG. 1 for natural language processing purposes, since NLP corpus 120 contains lexical, syntactic, and semantic information related to structured texts. The main types of metadata that may be extracted by email narration program 200 are concepts, categories, entities, relations, semantic roles, and keywords.

Concepts can be explicitly mentioned or implied in a message. Email narration program 200 recognizes high-level concepts that are related to text. For example, analysis of a message relating to a dance recital may lead to email narration program 200 extracting concepts such as choreography, music, or entertainment even if those terms are not explicitly mentioned in the message.

Categories can supply a sense of where in the domain's hierarchy the message's categories reside. For example, analysis of a message relating to a dance recital may lead to email narration program 200 extracting the category of art and entertainment, which can be broken into several sub-categories, such as literature, music, movies, and dance. Dance can be broken up into several more subcategories, such as ballroom dance, modern dance, and ballet dance. Categories can give a sense of scope on where the message fits in a global sense.

Entities are specific names of people, locations and organizations that can be extracted from text. Examples of entity supertypes include company, country, and person. Using these examples, email narration program 200 may detect "Acme Corporation" as a company, "United States of America" as a country, and "John Doe" as a person. If possible, email narration program 200 may detect subtypes for the entity, such as a job title for a person. For example, email narration program 200 may detect a subtype (such as manager), to the supertype, person.

Relations are pre-defined set of relationships between different entity types. Email narration program 200 may recognize when two entities are related and identify the type of relation. For example, an "awarded to" relation might connect the entities "Nobel Prize" and "Albert Einstein."

Semantic roles are specific verbs as actions and can be used to determine which phrases in the sentence are the most likely subject and object for the action. Semantic roles can describe what a certain noun is usually found doing, what sort of properties are usually ascribed to the subject, or even collect what someone has said on a certain topic. Email narration program 200 can collect information about what entities are doing in documents of a corpus. In general, email narration program 200 parses sentences into subject, action, and object form. For example, the system could determine John Doe "founded" Acme Corporation.

Keywords extracted are meant to give a word-cloud style summary of what's in a message, without giving too much information. Each keyword extracted is a phrase, generally between one to three words in length, selected as most relevant to understanding the message's content. Keywords are tags that email narration program 200 generates that tells what the message is about. For example, analysis of a message relating to a dance recital may lead to email narration program 200 extracting keywords such as ballet dance and dance performance.

Email narration program 200 determines the sentiment and emotion of the message (step 206). Email narration program 200 utilizes natural language processing to determine sentiment and emotion from the unstructured text found in the message. Email narration program may utilize natural language processing in ways described in step 204. In some embodiments, email narration program 200 utilizes NLP corpus 120 of FIG. 1 for natural language processing purposes. Email narration program 200 can determine the general sentiment of the message content or determine the sentiment toward specific target phrases found in the text. Additionally, sentiment for entities and keywords can be determined. In general, sentiment quantifies perception. A message's sentiment can be broken down into three categories: positive, negative or neutral. In an example, a message may have an overall sentiment score of 0.63 Positive (out of a scale from −1 Negative to 1 Positive) regarding "ballet," indicating the message has a strong positive view of "ballet." Email narration program 200 can determine sentiment in a document in multiple ways. Document sentiment can be determined by calculating a positive, negative, or neutral label as applied to an entire document. Targeted sentiment can be determined for a particular phrase in the message. Keywords and entities sentiment can be determined as applied to keywords and entities extracted in step 204 of email narration program 200.

Emotion is another measure that can be determined to understand how the message perceives a topic. Email narration program 200 can detect anger, disgust, fear, joy, and sadness implied in text on a scale of 0 to 1 by utilizing natural language processing in ways described in step 204. A score of 0 means the text does not convey the emotion; 1 indicates the text expresses the emotion strongly. Email narration program 200 can determine the overall emotional tone of the content or it can determine emotion conveyed by specific target phrases. Email narration program 200 can also determine emotion for entities and keywords that are extracted in step 204 of email narration program 200. In an example, a message may have an overall emotion score of 0.73 for joy regarding "ballet" and have an overall emotion score of 0.08 for anger regarding "ballet."

Email narration program 200 identifies recipients of the message (step 208). In some embodiments, email narration program 200 parses the names and email addresses listed in the "to:" and "cc:" fields of the email message. Each name/email address listed in the "to:" or "cc:" fields of the message are categorized as recipients of the message. Email narration program 200 bypasses and avoids the user's name when categorizing names as recipients. This allows email narration program 200 to be concerned with only the other recipients of the message besides the user. For example, an email message has the following people listed in the "to:" field of the message: User, Person W, Person X, and Person Y. The email message has the following people listed in the "cc:" field of the message: Person Z. Email narration program would identify the following people as recipients of the message: Person W, Person X, Person Y, and Person Z. In some embodiments, email narration program 200 differentiates between names listed in the "to:" field and the names listed in the "cc:" field. This differentiation may be used in creating the narration script in step 270.

Having identified recipients of the message, email narration program 200 proceeds to the following five steps, that can be conducted in parallel with each other based on how email narration program 200 is configured: steps 210, 212, 214, 216, and 218. In some embodiments, two or more of steps 210, 212, 214, 216, and 216 can be conducted sequentially (e.g., if one step depends on information obtained in a previous step). Email narration program 200 identifies messages with the same sender of the message collected (step 210). In some embodiments, email narration program 200 searches and identifies messages with the same sender from email repository 112 of FIG. 1. For example, User receives a message from Person A. Email narration program 200 identifies the messages in email repository 112 that also were sent by Person A.

Email narration program 200 identifies messages with the same recipients of the message collected (step 212). In some embodiments, email narration program 200 searches and identifies messages from email repository 112 of FIG. 1. In some embodiments, email narration program 200 identifies messages that include one or more of the recipients. For example, Person V is a recipient of an email message received by User. Email narration program 200 identifies messages in User's email repository that Person V is a party to. In other embodiments, email narration program 200 may be configured to only identify messages with a certain number of recipients. For example, User may configure email narration program 200 to only identify messages with three or more of the recipients of a collected message. The collected message contains five recipients: Person V, Person W, Person X, Person Y, and Person Z. Email narration program 200 collects messages with any combination of three or more of those five recipients.

Email narration program 200 identifies messages with similar metadata of the message collected (step 214). In some embodiments, email narration program 200 searches and identifies messages from email repository 112 of FIG. 1. In some embodiments, email narration program 200 may be configured to identify messages with a certain level of similarity to metadata extracted in step 204. Email narration program 200 compares metadata extracted from the message to metadata of other messages. The user or the system may determine a threshold level of similarity of metadata. Email narration program 200 may identify messages with a certain amount of identical metadata as the collected message. In other embodiments, email narration program 200 may be configured to identify messages with a certain level of similarity to the types of metadata extracted (such as concepts, categories, entities, relations, semantic roles, and keywords). For example, email narration program 200 is configured to identify messages with similar concepts extracted in the collected message. The collected message has the following concepts: choreography, music, and entertainment. Email narration program 200 collects messages with concepts of choreography, music, or entertainment. In another example, email narration program 200 is configured to identify messages that share all the same concepts extracted in the collected message. Email narration program 200 collects messages that has the concepts of choreography, music, and entertainment.

Email narration program 200 identifies messages with similar sentiment and/or emotion of the message collected (step 216). In some embodiments, email narration program 200 searches and identifies messages from email repository 112 of FIG. 1. In some embodiments, email narration program 200 may be configured to identify messages with a certain level of similarity to sentiment and/or emotion extracted in step 206. Email narration program 200 compares sentiment and/or emotion extracted from the message to sentiment and/or emotion of other messages. The user or the system may determine a threshold level of similarity of sentiment and/or emotion. Email narration program 200 may identify messages with a certain amount of identical sentiment and/or emotion as the collected message and may be configured to identify messages within a certain range of the sentiment and/or emotion scores determined. For example, email narration program 200 is configured to identify messages with emotion scores within 0.1 of the determined emotion scores of the collected message. The collected message has the following emotion score: 0.73 for joy regarding "ballet" and 0.08 for anger regarding "ballet." Email narration program 200 collects messages with emotion scores ±0.1 of 0.73 for joy regarding "ballet" and ±0.1 of 0.08 for anger regarding "ballet."

Email narration program 200 identifies phone calls and calendar events of the user that are relevant to the recipients (step 218). Phone calls and calendar events that are relevant to the recipients are phone calls and calendar events that the user shares with one or more of the recipients. In some embodiments, email narration program 200 searches and identifies phone calls and calendar events from phone call repository 116 and event calendar 118 of FIG. 1, respectively. In some embodiments, a calendar event is identified as relevant if the calendar event has a certain number of recipients also attending the calendar event. For example, email narration program 200 is configured to identify a calendar event as relevant if the event is attended by the user and three of the recipients of the collected message. The collected message contains five recipients: Person V, Person W, Person X, Person Y, and Person Z. A calendar event is RSVPed by the user, Person V, Person X, and Person Y. Therefore, email narration program 200 identifies the calendar event.

Having conducted one or more of steps 210-218, email narration program 200 proceeds to select one of the recipients (step 220). Once a recipient is selected by email narration program 200, email narration program 200 uses that recipient as the selected recipient and proceeds until email narration program 200 selects another recipient. If another recipient is selected by email narration program 200 (i.e., a subsequent iteration of step 220), the selected recipient replaces the previously selected recipient as the selected recipient used in steps 220-256.

Having selected a recipient, email narration program 200 determines whether the number of messages with the selected recipient is greater than a high threshold (decision step 222). In some embodiments, the user, utilizing email access UI 105 of email access device 104 of FIG. 1, identifies a high threshold for the number of messages that include the selected recipient. The number of messages that include the selected recipient may be referred to as a selected count of messages. A "high threshold" is an upper limit to the number of messages that was also sent to the selected recipient. If there are more messages with the selected recipient than the high threshold, the recipient is considered important. If there are less messages with the selected recipient than the high threshold, the recipient is not considered important. In some embodiments, email narration program 200 searches the messages identified in step 212 to determine whether the number of messages with the selected recipient is greater than a high threshold. In other embodiments, email narration program 200 searches email repository 112 for messages including the selected recipient. In yet other embodiments, decision step 222 is not limited to just messages, but also includes phone calls and calendar events. Phone calls and calendar events identified by email narration program 200 in step 218 are searched by email narration program 200 to determine whether the number of messages with the selected recipient is greater than a high threshold. In yet other embodiments, email narration program 200 searches phone call repository 116 and event calendar 118 for phone calls and calendar events that include the selected recipient.

For the case in which email narration program 200 determines the number of messages with the selected recipient is not greater than the high threshold (step 222, "NO"

branch), email narration program 200 proceeds to assign low importance to the selected recipient for the narration population group of "important recipients" (step 224). A narration population group is a group email narration program 200 uses to populate a narration script. Members of a narration population group assigned high importance are used by email narration program 200 to populate the narration script. In one embodiment, email narration program 200 uses five narration population groups: "important recipients", "non-typical recipients", "important recipient roles", "topic relevant recipients", and "important collective names." Email narration program 200 uses these five narration population groups to populate a narration script in steps 272-280. In another embodiment, additional narration population groups may be used to populate a narration script. In some embodiments, high and low ratings translate to a binary scale of importance that email narration program 200 can use in populating a narration script. For example, email narration program 200 may be configured to rate importance as either "high importance" or "low importance." If the number of messages including the selected recipient is under a specified threshold, the recipient is assigned a low importance recipient rating. If the number of messages including the selected recipient is above a specified threshold, the recipient is assigned a high importance recipient rating. In other embodiments, high and low ratings translate to a numerical scoring system that email narration program 200 can use in populating a narration script. In the numerical scoring system, email narration program 200 may be configured to rate importance on a scale of 1 to 10, with 1 being the lowest importance and 10 being the highest importance. Importance scores may be assigned in relation to how close or far away from the threshold the number of messages is, scaled in relation to the number of messages other recipients are included on. For example, if the number of messages including the selected recipient is below a specified threshold, the recipient may receive an importance score of 2. In a different iteration (for a different selected recipient), if the number of messages including the selected recipient is below a specified threshold but not as far away from the threshold as the other selected recipient, the recipient may receive an importance score of 3.

For the case in which email narration program 200 determines the number of messages with the selected recipient is greater than the high threshold (step 222, "YES" branch), email narration program 200 proceeds to assign high importance to the selected recipient for the narration population group of "important recipients" (step 226). In some embodiments, high and low ratings translate to a binary scale of importance that email narration program 200 can use in populating a narration script as described in step 224. In other embodiments, high and low ratings translate to a numerical scoring system that email narration program 200 can use in populating a narration script, as described in step 224. For example, if the number of messages including the selected recipient is above a specified threshold, the recipient may receive an importance score of 7. In a different iteration (for a different selected recipient), if the number of messages including the selected recipient is above a specified threshold but not as far away from the threshold as the other selected recipient, the recipient may receive an importance score of 6.

Having assigned low importance to the selected recipient for the narration population group of "important recipients," email narration program 200 determines whether the number of messages with the selected recipient is less than a low threshold (decision step 228). In some embodiments, the user, utilizing email access UI 105 of email access device 104 of FIG. 1, identifies a low threshold for the number of messages that include the selected recipient. A "low threshold" is a lower limit to the number of messages that was also sent to the selected recipient. If there are less messages with the selected recipient than the low threshold, the recipient is considered important. If there are more messages with the selected recipient than the low threshold, the recipient is not considered important. In some embodiments, email narration program 200 searches the messages identified in step 212 to determine whether the number of messages with the selected recipient is less than a low threshold. In other embodiments, email narration program 200 searches email repository 112 for messages including the selected recipient. In yet other embodiments, decision step 228 is not limited to just messages, but also includes phone calls and calendar events. Phone calls and calendar events identified by email narration program 200 in step 218 are searched by email narration program 200 to determine whether the number of messages with the selected recipient is less than a low threshold. In yet other embodiments, email narration program 200 searches phone call repository 116 and event calendar 118 for phone calls and calendar events that include the selected recipient.

For the case in which email narration program 200 determines the number of messages with the selected recipient is not less than the low threshold (step 228, "NO" branch), email narration program 200 proceeds to assign low importance to the selected recipient for the narration population group of "non-typical recipients" (step 230). In some embodiments, high and low ratings translate to a binary scale of importance that email narration program 200 can use in populating a narration script, as described in step 224. If the number of messages including the selected recipient is less than a specified threshold, the recipient is assigned a high non-typical recipient rating. If the number of messages including the selected recipient is greater than a specified threshold, the recipient is assigned a low non-typical recipient rating. In other embodiments, high and low ratings translate to numerical scores that email narration program 200 can use in populating a narration script, as described in step 224. Importance scores may be assigned in relation to how close or far away from the threshold the number of messages is, scaled in relation to the number of messages other recipients are included on. For example, if the number of messages including the selected recipient is above a specified threshold, the recipient may receive an importance score of 1. In a different iteration (for a different selected recipient), if the number of messages including the selected recipient is above a specified threshold but not as far away from the threshold as the other selected recipient, the recipient may receive an importance score of 2.

For the case in which email narration program 200 determines the number of messages with the selected recipient is less than the low threshold (step 228, "YES" branch), email narration program 200 proceeds to assign high importance to the selected recipient for the narration population group of "non-typical recipients" (step 232). In some embodiments, high and low ratings translate to a binary scale of importance that email narration program 200 can use in populating a narration script, as described in steps 224 and 230. In other embodiments, high and low ratings translate to numerical scores that email narration program 200 can use in populating a narration script, as described in steps 224 and 230. For example. if the number of messages including the selected recipient is below a specified threshold, the recipient may receive an importance score of 8. In a different iteration (for a different selected recipient), if the number of messages including the selected recipient is below a specified threshold but not as far away from the threshold as the other selected recipient, the recipient may receive an importance score of 7.

Having assigned high importance to the selected recipient for the narration population group of "important recipients" (step 226), assigned low importance to the selected recipient for the narration population group of "non-typical recipients" (step 230), or assigned high importance to the selected recipient for the narration population group of "non-typical recipients" (step 232), email narration program 200 proceeds to determine the job roles of the user and the selected recipient (step 234). In some embodiments, email narration program 200 accesses and searches corporate directory 114 of FIG. 1 to determine the job roles of both the user and the selected recipient. For example, email narration program 200 accesses the corporate directory of Acme Corporation and determines User is a software engineer and Recipient A is a software product manager. In other embodiments, email narration program 200 utilizes metadata extracted from the message, as well as metadata extracted from messages identified in steps 210-218, to determine job roles of the user and the selected recipient. In many instances, corporate employees write their job roles in the signature line of emails. Metadata extracted from emails sent by the user and/or emails sent by the selected recipient may capture the job roles of the user and the selected recipient. Email narration program 200 can parse extracted metadata to determine job roles.

Email narration program 200 determines the reporting structure in relation to the user and the selected recipient (step 236). A reporting structure is the organizational relationship between two individuals belonging to an organization. In some embodiments, email narration program 200 accesses and searches corporate directory 114 of FIG. 1 to determine the reporting structure. Many corporate directories contain the organizational relationship and hierarchical relationship between two employees. Using the previous example, email narration program 200 accesses the corporate directory of Acme Corporation and determines User, a software engineer, is the subordinate of Recipient A, a software product manager. Email narration program 200 determines Recipient A is the manager of User. In other embodiments, email narration program 200 utilizes metadata extracted from the message, as well as metadata extracted from messages identified in steps 210-218, to determine the reporting structure between the user and the selected recipient. Metadata extracted from emails sent by the user and/or emails sent by the selected recipient may capture the reporting structure of the user and the selected recipient. Email narration program 200 can parse extracted metadata to determine reporting structures and organizational relationships.

Email narration program 200 determines the degree of separation between the user and the selected recipient (step 238). Based on the reporting structure in relation to the user and the selected recipient, email narration program 200 determines how far away the user and selected recipient are in the corporate or organizational hierarchy. For example, an employee who reports directly to a manager would have one-degree separation between the two. However, an employee may have a six-degree separation between a company's chief executive officer. In some instances, two employees may be on different reporting structures and are not subordinate to each other. For example, a vice president of marketing and a vice president of engineering may both report to a single executive (like a company president) but not report to each other. In these cases, the degree of separation would be zero, as the separation between the two is null. In some embodiments, email narration program 200 accesses and searches corporate directory 114 of FIG. 1 to determine the degree of separation between the user and the selected recipient. Some corporate directories contain the organizational relationship and hierarchical relationship between two employees along with the degree of separation between the two. In other embodiments, email narration program 200 utilizes metadata extracted from the message, as well as metadata extracted from messages identified in steps 210-218, to determine the degree of separation between the user and the selected recipient. Metadata extracted from emails sent by the user and/or emails sent by the selected recipient may capture the degree of separation of the user and the selected recipient. Email narration program 200 can parse extracted metadata to determine this degree of separation.

Having determined the degree of separation between the user and the selected recipient, email narration program 200 determines whether the degree of separation is less than a threshold (decision step 240). In some embodiments, the user, utilizing email access UI 105 of email access device 104 of FIG. 1, identifies a threshold for the degree of separation between the user and the selected recipient. The threshold may be a specified numerical degree of separation. If the degree of separation between the user and the selected recipient is less than the threshold, the recipient's job role is considered important. If the degree of separation between the user and the selected recipient is not less than the threshold, the recipient's job role is not considered important. In other embodiments, importance may be configurable in relation to the user and the selected recipient. For example, a user may configure that if the degree of separation between the user and the selected recipient is greater than the threshold, the recipient's job role is considered important and vice versa.

For the case in which email narration program 200 determines the degree of separation is not less than the threshold (step 240, "NO" branch), email narration program 200 proceeds to assign low importance to the recipient job role for the narration population group of "important recipient roles" (step 242). In some embodiments, high and low ratings translate to a binary scale of importance that email narration program 200 can use in populating a narration script, as described in step 224. If the degree of separation is greater than a specified threshold, the recipient role is assigned a low importance recipient role rating. If the degree of separation is below a specified threshold, the recipient role is assigned a high importance recipient role rating. In other embodiments, high and low ratings translate to a numerical scoring system that email narration program 200 can use in populating a narration script, as described in step 224. Importance scores may be assigned in relation to how close or far away from the threshold the degree of separation is, scaled in relation to degrees of separation between other recipients and the user. For example, if the degree of separation is above a specified threshold, the recipient role may receive an importance score of 3. In a different iteration (for a different selected recipient), if degree of separation is above a specified threshold but not as far away from the threshold as the other degree of separation, the recipient role may receive an importance score of 4.

For the case in which email narration program 200 determines the degree of separation is less than the threshold (step 240, "YES" branch), email narration program 200 proceeds to assign high importance to the recipient job role for the narration population group of "important recipient roles" (step 244). In some embodiments, high and low ratings translate to a binary scale of importance that email narration program 200 can use in populating a narration script, as described in steps 224 and 242. In other embodiments, high and low ratings translate to numerical scores that email narration program 200 can use in populating a narration script, as described in steps 224 and 242. For example, if the degree of separation is below a specified threshold, the recipient role may receive an importance score of 9. In a different iteration (for a different selected recipient), if degree of separation is below a specified threshold but not as far away from the threshold as the other degree of separation, the recipient role may receive an importance score of 8.

Having assigned low importance to the recipient role for the narration population group of "important recipient roles" (step 242) or assigned high importance to the recipient role for the narration population group of "important recipient roles" (step 244), email narration program 200 proceeds to determine the topic of the collected message (step 246). In some embodiments, the topic of the collected message may be directly associated with metadata extracted and/or sentiment/emotion determined from the message (see steps 204 and 206). Metadata may consist of concepts, categories, entities, relations, semantic roles, and/or keywords. In one example, metadata extracted from a message consists of the keywords "software update" and "Project Beta." Email narration program 200 determines the topic of the message is "software update" and/or "Project Beta." In other embodiments, email narration program 200 detects patterns in metadata and/or sentiment/emotion via machine learning and pattern recognition techniques, as would be appreciated by one with skill in the art. This may lead email narration program 200 to obtain a more specific topic of the collected message. Machine learning explores the study and construction of algorithms that can learn from and make predictions based on data. Such algorithms operate by building a model from example inputs in order to make data-driven predictions or decisions expressed as outputs, rather than following strictly static program instructions. Within the field of data analytics, machine learning is a method used to devise complex models and algorithms that lend themselves to decisions, and probability related prediction. These analytical models enable researchers, data scientists, engineers, and analysts to produce reliable, repeatable decisions and results and to uncover hidden insights through learning from historical relationships and trends in the data. Pattern recognition is a branch of machine learning that focuses on the recognition of patterns and regularities in data. Pattern recognition systems may be trained from labeled "training" data (supervised learning), but when no labeled data are available, other algorithms can be used to discover previously unknown patterns (unsupervised learning). Metadata, such as concepts or keywords, from messages and/or phone calls and calendar events, identified by email narration program 200 in steps 210-218, may represent training data for supervised learning. From metadata extracted from these messages, pattern recognition systems may determine commonly used message topics. For example, email narration program 200, using pattern recognition techniques on messages identified with similar metadata and similar sentiment/emotion, determines a topic is "Project Beta software update."

Email narration program 200 determines a list of recipients associated with the topic of the collected message (step 248). In some embodiments, email narration program 200 parses identified messages and/or phone calls and calendar events from steps 210-218 to determine a list of recipients associated with the topic. Email narration program 200 may utilize machine learning and pattern recognition techniques, described previously in step 246, on the identified messages to find recipients associated with the topic. Using the previous example, email narration program 200, using pattern recognition techniques on messages identified with similar metadata and similar sentiment/emotion, determines Recipient W, Recipient X, Recipient Y, and Recipient Z as recipients associated with "Project Beta software update."

Having determined a list of recipients associated with the topic of the collected message, email narration program 200 determines whether the number of messages that include both the selected recipient and the determined topic is greater than a threshold (decision step 250). In some embodiments, the user, utilizing email access UI 105 of email access device 104 of FIG. 1, identifies a threshold for the number of messages that include both the selected recipient and the determined topic. The threshold may be a number of messages that was sent to the selected recipient and also contains a determined topic. If there are less messages with the selected recipient and the determined topic than the threshold, the recipient is not considered important. If there are more messages with the selected recipient than the threshold, the recipient is considered important. In some embodiments, email narration program 200 utilizes metadata searching techniques, such as pattern recognition techniques, to identify messages already identified in step 212 to determine whether the messages contain the selected recipient and the determined message topic. Email narration program 200 determines whether the number of messages then identified is less than a threshold. In other embodiments, email narration program 200 searches email repository 112 for messages. In yet other embodiments, decision step 250 is not limited to just messages, but also includes phone calls and calendar events. Phone calls and calendar events identified by email narration program 200 in step 218 are searched by email narration program 200 to determine whether the messages contain the selected recipient and the determined message topic and whether the number of messages is less than a threshold. In yet other embodiments, email narration program 200 searches phone call repository 116 and event calendar 118 for phone calls and calendar events.

For the case in which email narration program 200 determines the number of messages with the selected recipient and the determined topic is not less than the threshold (step 250, "NO" branch), email narration program 200 proceeds to assign low importance to the selected recipient for the narration population group of "topic relevant recipients" (step 252). In some embodiments, high and low ratings translate to a binary scale of importance that email narration program 200 can use in populating a narration script, as described in step 224. If the number of messages including the selected recipient and the determined topic is less than a specified threshold, the recipient is assigned a low topic relevant recipient rating. If the number of messages including the selected recipient and the determined topic is greater than a specified threshold, the recipient is assigned a high topic relevant recipient rating. In other embodiments, high and low ratings translate to a numerical scoring system that email narration program 200 can use in populating a narration script, as described in step 224. Importance scores may be assigned in relation to how close or far away from the threshold the number of messages is, scaled in relation to the number of messages other recipients are included on with the determined topic. For example, if the number of messages including the selected recipient and the determined topic is below a specified threshold, the recipient may receive an importance score of 2. In a different iteration (for a different selected recipient), if the number of messages including the selected recipient and the determined topic is below a specified threshold but not as far away from the threshold as the other selected recipient, the recipient may receive an importance score of 3.

For the case in which email narration program 200 determines the number of messages with the selected recipient and the determined topic is not less than the threshold (step 250, "YES" branch), email narration program 200 proceeds to assign high importance to the selected recipient for the narration population group of "topic relevant recipients" (step 254). In some embodiments, high and low ratings translate to a binary scale of importance that email narration program 200 can use in populating a narration script, as described in steps 224 and 252. In other embodiments, high and low ratings translate to a numerical scoring system that email narration program 200 can use in populating a narration script, as described in steps 224 and 252. For example, if the number of messages including the selected recipient and the determined topic is above a specified threshold, the recipient may receive an importance score of 10. In a different iteration (for a different selected recipient), if the number of messages including the selected recipient and the determined topic is above a specified threshold but not as far away from the threshold as the other selected recipient, the recipient may receive an importance score of 9.

Having assigned low importance to the recipient for the narration population group of "topic relevant recipients" (step 252) or assigned high importance to the recipient for the narration population group of "topic relevant recipients" (step 254), email narration program 200 proceeds to determine whether there are additional recipients on the collected message that have not yet been selected (decision step 256). Email narration program 200 determines whether the collected message has additional recipients, identified in step 208, other than a selected or previously selected recipient. For example, email narration program 200 identifies the following as recipients: Person W, Person X, Person Y, and Person Z. Email narration program has previously selected Person W and Person X. Person Y is currently selected by email narration program 200. Email narration program 200 proceeds to determine there are additional recipients on the message that have not yet been selected (Person Z).

For the case in which email narration program 200 determines there are additional recipients on the collected message that have not yet been selected (step 256, "YES" branch"), email narration program 200 returns to step 220 to select one of the remaining recipients. In this case, email narration program 200 proceeds to return to step 220 to select a recipient (i.e., a subsequent iteration of step 220).

For the case in which email narration program 200 determines there are no additional recipients on the collected message that have not yet been selected (step 256, "NO" branch"), email narration program 200 proceeds to determine whether there is a collective name associated with a topic (decision step 258). A collective name is a name of a group of individuals. The individuals may be recipients all associated with a topic, determined in step 256. For example, a topic of a message is "Project Beta software update." An example of a collective name is "Project Beta software update development team," which is comprised of employees who are part of the development team for the Project Beta software update. In some embodiments, a collective name may be directly associated with metadata extracted and/or sentiment/emotion determined from the message (see steps 204 and 206). Metadata may consist of concepts, categories, entities, relations, semantic roles, and/or keywords. In one example, metadata extracted from a message consists of the entity "development team." Email narration program 200 determines topic is "Project Beta software update." Email narration program 200 determines that the entity "development team" is a collective name and is associated with the topic "Project Beta software update." In other embodiments, email narration program 200 detects patterns in metadata and/or sentiment/emotion via machine learning and pattern recognition techniques, as described previously. This may lead email narration program 200 to obtain more specific collective names. Metadata, such as concepts or keywords, from messages and/or phone calls and calendar events, identified by email narration program 200 in steps 210-218, may represent training data for supervised learning. From metadata extracted from these messages, pattern recognition systems may determine commonly used collective names. For example, email narration program 200, using pattern recognition techniques on messages identified with similar metadata and similar sentiment/emotion, determines a collective name is "Project Beta software update development team." More than one collective name may be associated with a topic and more than one collective name may be present in a message. Email narration program 200 determines whether one or more collective names are present in the collected message. In some instances, no collective name may be present.

For the case in which email narration program 200 determines there is a collective name associated with a topic in the collected message (step 258, "YES" branch), email narration program 200 selects a collective name (step 260). Once a collective name is selected by email narration program 200, email narration program 200 uses that collective name as the selected collective name and proceeds until email narration program 200 selects another collective name. If another collective name is selected by email narration program 200 (i.e., a subsequent iteration of step 260), the selected collective name replaces the previously selected collective name as the selected collective name used in steps 260-268.

Having selected a collective name, email narration program 200 determines whether the number of recipients on the collected message associated with the collective name is greater than a threshold (decision step 262). In some embodiments, email narration program 200 detects patterns in metadata and/or sentiment/emotion via machine learning and pattern recognition techniques, as described previously, to determine all individuals who may be associated with the collective name. Metadata, such as entities, from messages and/or phone calls and calendar events, identified by email narration program 200 in steps 210-218, may represent training data for supervised learning. From metadata extracted from these messages, pattern recognition systems may determine commonly used associated people. For example, email narration program 200, using pattern recognition techniques on messages identified with similar metadata and similar sentiment/emotion, determines ten employees associated with the collective name "Project Beta software update development team." Email narration program 200 compares the list of recipients of the collected message with the individuals email narration program 200 determines are associated with the collective name. In some embodiments, the user, utilizing email access UI 105 of email access device 104 of FIG. 1, identifies a threshold as the number of recipients on the message associated with the collective name. The threshold may be a specified numerical number of recipients. If the number of recipients on the message associated with the collective name is less than the threshold, the collective name is not considered important. If the number of recipients on the message associated with the collective name is greater than the threshold, the collective name is considered important.

For the case in which email narration program 200 determines the number of recipients on the collected message associated with the collective name is not greater than a threshold (step 262, "NO" branch), email narration program 200 proceeds to assign low importance to the collective name for the narration population group of "important collective names" (step 264). In some embodiments, high and low ratings translate to a binary scale of importance that email narration program 200 can use in populating a narration script, as described in step 224. If the number of recipients on the message associated with the collective name is below than a specified threshold, the collective name is assigned a low important collective name rating. If the number of recipients on the message associated with the collective name is above a specified threshold, the collective name is assigned a high important collective name rating. In other embodiments, high and low ratings translate to a numerical scoring system that email narration program 200 can use in populating a narration script, as described in step 224. Importance scores may be assigned in relation to how close or far away from the threshold the number of recipients on the collected message associated with the collective name is, scaled in relation to other collected messages. For example, if the number of recipients on the message associated with the collective name is below a specified threshold, the collective name may receive an importance score of 3. In a different iteration (for a different selected collective name), if the number of recipients on the message associated with the collective name is below a specified threshold but not as far away from the threshold as the other degree of separation, the collective name may receive an importance score of 4.

For the case in which email narration program 200 determines the number of recipients on the collected message associated with the collective name is greater than a threshold (step 262, "YES" branch), email narration program 200 proceeds to assign low importance to the collective name for the narration population group of "important collective names" (step 266). In some embodiments, high and low ratings translate to a binary scale of importance that email narration program 200 can use in populating a narration script, as described in steps 224 and 264. In other embodiments, high and low ratings translate to a numerical scoring system that email narration program 200 can use in populating a narration script, described in steps 224 and 264. For example, if the degree of separation is above a specified threshold, the collective name may receive an importance score of 7. In a different iteration (for a different selected collective name), if degree of separation is above a specified threshold but not as far away from the threshold as the other degree of separation, the collective name may receive an importance score of 6.

Having assigned low importance to the selected collective name for the narration population group of "important collective names" (step 264) or assigned high importance to the selected collective name for the narration population group of "important collective names" (step 266), email narration program 200 proceeds to determine whether there are additional collective names on the collected message that have not yet been selected (decision step 268). Email narration program 200 determines whether the collected message has additional collective names, identified in decision step 258, other than a selected or previously selected recipient.

For the case in which email narration program 200 determines there are additional collective names that have not yet been selected (step 268, "YES" branch"), email narration program 200 returns to step 260 to select one of the remaining recipients. In this case, email narration program 200 proceeds to return to step 260 to select a collective name (i.e., a subsequent iteration of step 260).

For the case in which email narration program 200 determines there are no additional collective names that have not yet been selected (step 268, "NO" branch") or for the case in which email narration program 200 determines there are no collective names associated with a topic in the collected message, email narration program 200 proceeds to create a narration script (step 270). A narration script is communication associated with an email message that can be played as audio or displayed on a device, such as email access device 104 of FIG. 1. In some embodiments, the narration script includes a description of when the message was sent and by whom. The narration script may also contain the subject line and the content of the message. For example, a sample narration script created by email narration program 200 may read: "At 12:57 pm, Sender sent you an email about Project Beta software update. It says, 'We need to move forward with . . . .'" In this example, 12:57 pm is the time the email was sent, Sender is the person sending the email, Project Beta software update is the subject line, and 'We need to move forward with . . . ' is the content of the email. In some embodiments, recipients of the message may also be listed in the narration script, which comprise of the narration population groups used by email narration program 200. Email narration program may populate the narration script with the recipients, recipient roles, or collective names that were assigned high importance based on importance assignments by email narration program 200. In one embodiment, email narration program 200 uses five narration population groups: "important recipients", "non-typical recipients", "important recipient roles", "topic relevant recipients", and "important collective names."

Figure 3A:
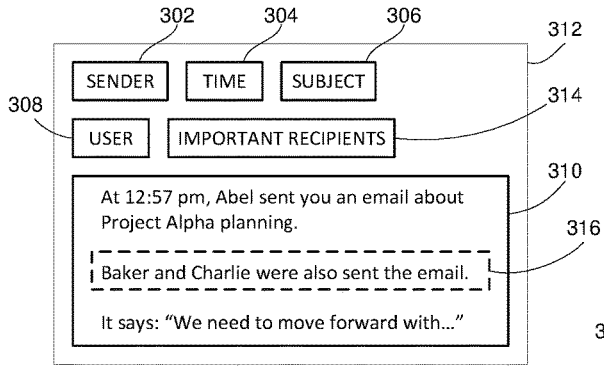
FIGS. 3A-3E are screenshots depicting example narration scripts, based on the significance of the recipients on the message, displayed on computing device within the computing environment of FIG. 1, in accordance with an embodiment of the present invention.

Email narration program 200 populates the narration script with recipient(s) assigned high importance for the narration population group "important recipients" (step 272). In some embodiments, recipients assigned high importance in step 226 may populate the narration script as important recipients. In some embodiments, the narration script mentions the importance of the recipients listed. In other embodiments, the recipients assigned high importance are listed in the narration script along with the rest of narration script. FIG. 3A depicts an example screenshot of a narration script populated with recipient(s) assigned high importance for the narration population group "important recipients." Users may configure a hierarchy of importance of narration population groups for email narration program 200 for the case in which a recipient falls within more than one narration population group and is assigned high importance ratings for more than one narration population group. In various embodiments, a narration script may be populated by one or more narration population groups. For example, a narration script may be populated by the narration population group "important recipients," "non-typical recipients," and "important collective names."

FIGS. 3A-3E are screenshots of example narration scripts displayed by a computing device within the computing environment of FIG. 1, in accordance with an embodiment of the present invention. For example, FIGS. 3A-3F depict screenshots 312, 318, 324, 330, and 336, associated with email narration program 200 on email narration server 108 within computing environment 100. In other examples, FIGS. 3A-3F depict screenshots 312, 318, 324, 330, and 336, associated with email narration program 200 on email access device 104 within computing environment 100.

FIG. 3A depicts screenshot 312 of an example narration script that is populated by the narration population group "important recipients," in accordance to an embodiment. Screenshot 312 includes message sender display 302, message time display 304, message subject display 306, message user display 308, narration population group display 314, and created narration script display 310. Created narration script display 310 includes narration population group insert 316. Message sender display 302 displays the name of the sender of the email message. Message time display 304 displays the time of receipt of the email message. Message subject display 306 displays the subject line of the email message. Message user display 308 displays the name of the user receiving the email message. Created narration script display 310 displays the created narration script by email narration program 200. In some embodiments, most of the narration script is created by email narration program 200 in step 270 of FIG. 2. The narration script may include the sender's name, the time of the message, the subject line, a designation to the user, and an insert populated by one or more narration population groups. Narration population group display 314 displays the narration group(s) that are included in the created narration script. In screenshot 312, the narration population group "important recipients" is included in the created narration script. Created narration script display 310 includes narration population group insert 316, which lists the recipient(s), recipient role(s), and/or collective name(s) that was assigned high importance by email narration program 200. In screenshot 312, narration population group insert 316 lists recipients assigned high importance for the narration population group "important recipients."

To illustrate the functionality described above with respect to FIGS. 1, 2A-F, and 3A, in one specific example, a user of email access device 104, Frank, selects an email message Frank received from work using email access UI 105. The email message was sent by Abel at 12:57 pm with the subject line: Project Alpha planning. Also receiving the email was Baker, Charlie, David, and Eliza. Baker and Charlie were consistently sent many messages that Frank also received. Email narration program 200 assigns high importance to Baker and Charlie as "important recipients." Email narration program 200 creates a narration script saying "At 12:57 pm, Abel sent you an email about Project Alpha planning. It says: "We need to move forward with . . . ." Email narration program 200 populates the narration script with a line regarding the important recipients. The updated narration script would read: "At 12:57 pm, Abel sent you an email about Project Alpha planning. Baker and Charlie were also sent the email. It says: "We need to move forward with . . . ."

Figure 3B:
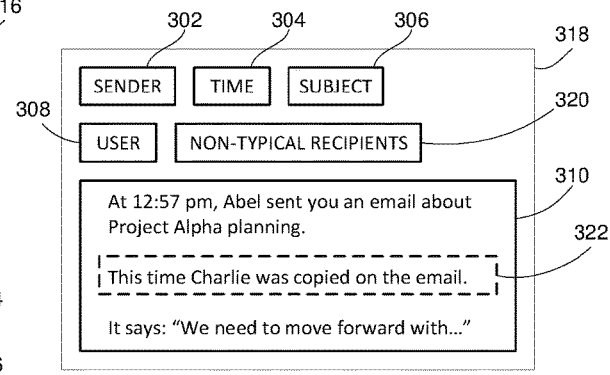

Email narration program 200 populates the narration script with recipient(s) assigned high importance for the narration population group "non-typical recipients" (step 274). In some embodiments, recipients assigned high importance in step 232 may populate the narration script as non-typical recipients. In some embodiments, the narration script mentions the importance of the recipients listed. In other embodiments, the recipients assigned high importance are listed in the narration script along with the rest of narration script. FIG. 3B depicts an example screenshot of a narration script populated with recipient(s) assigned high importance for the narration population group "non-typical recipients."

FIG. 3B depicts screenshot 318 of an example narration script that is populated by the narration population group "non-typical recipients," in accordance to an embodiment. Screenshot 318 includes message sender display 302, message time display 304, message subject display 306, message user display 308, narration population group display 320, and created narration script display 310. Created narration script display 310 includes narration population group insert 322. Narration population group display 320 displays the narration group(s) that are included in the created narration script. In screenshot 318, the narration population group "non-typical recipients" is included in the created narration script. Created narration script display 310 includes narration population group insert 322, which lists the recipient(s), recipient role(s), and/or collective name(s) that was assigned high importance by email narration program 200. In screenshot 318, narration population group insert 322 lists recipients assigned high importance for the narration population group "non-typical recipients."

To illustrate the functionality described above with respect to FIGS. 1, 2A-F, and 3B, in one specific example, a user of email access device 104, Frank, selects an email message Frank received from work using email access UI 105. The email message was sent by Abel at 12:57 pm with the subject line: Project Alpha planning. Also receiving the email was Baker, Charlie, David, and Eliza. Charlie has never been sent an email from Abel before that Frank also received. Email narration program 200 assigns high importance to Charlie as a "non-typical recipient." Email narration program 200 creates a narration script saying "At 12:57 pm, Abel sent you an email about Project Alpha planning. It says: "We need to move forward with . . . ." Email narration program 200 populates the narration script with a line regarding the non-typical recipient. The updated narration script would read: "At 12:57 pm, Abel sent you an email about Project Alpha planning. This time Charlie was copied on the email. It says: "We need to move forward with . . . ."

Email narration program 200 populates the narration script with recipient(s) assigned high importance for the narration population group "important recipient roles" (step 276). In some embodiments, recipient roles assigned high importance in step 244 may populate the narration script as important recipient roles. In some embodiments, the narration script mentions the importance of the recipient roles listed. In other embodiments, the recipient roles assigned high importance are listed in the narration script along with the rest of narration script. In yet other embodiments, the recipient role is listed in relation to the role of the user within the reporting structure. In an example, Person V is the vice president of marketing and User's manager. In some embodiments, the role of Person V ("vice president of marketing") is populated in the narration script. In other embodiments, the role of Person V in relation to the user ("User's manager") is populated in the narration script. If a recipient's name is already populated in the narration script and email narration program 200 determines the recipient's role is important, the recipient's role may be listed along with the recipient's name. Using the previous example, the narration script may be populated as "Person V, the User's manager." FIG. 3C depicts an example screenshot of a narration script populated with recipient role(s) assigned high importance for the narration population group "important recipient roles."

Figure 3C:
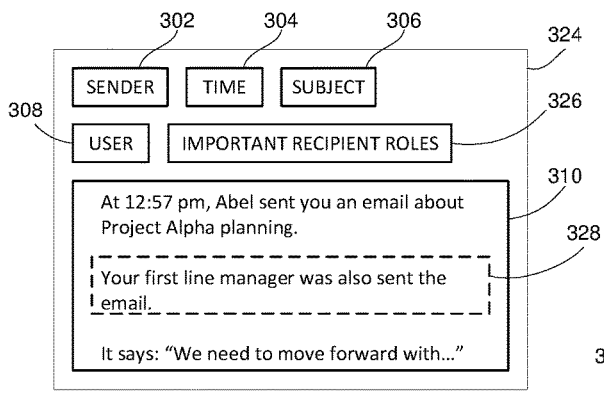

FIG. 3C depicts screenshot 324 of an example narration script that is populated by the narration population group "important recipient roles," in accordance to an embodiment. Screenshot 324 includes message sender display 302, message time display 304, message subject display 306, message user display 308, narration population group display 326, and created narration script display 310. Created narration script display 310 includes narration population group insert 328. Narration population group display 326 displays the narration group(s) that are included in the created narration script. In screenshot 324, the narration population group "important recipient roles" is included in the created narration script. Created narration script display 310 includes narration population group insert 328, which lists the recipient(s), recipient role(s), and/or collective name(s) that was assigned high importance by email narration program 200. In screenshot 324, narration population group insert 328 lists recipients assigned high importance for the narration population group "important recipient roles."

To illustrate the functionality described above with respect to FIGS. 1, 2A-F, and 3C, in one specific example, a user of email access device 104, Frank, selects an email message Frank received from work using email access UI 105. The email message was sent by Abel at 12:57 pm with the subject line: Project Alpha planning. Also receiving the email was Baker, Charlie, David, Eliza, and Abel's first line manager. Abel reports directly to the first line manager. Email narration program 200 assigns high importance to the first line manager as a "important recipient role." Email narration program 200 creates a narration script saying "At 12:57 pm, Abel sent you an email about Project Alpha planning. It says: "We need to move forward with . . . ."" Email narration program 200 populates the narration script with a line regarding the important recipient role. The updated narration script would read: "At 12:57 pm, Abel sent you an email about Project Alpha planning. Your first line manager was also sent the email. It says: "We need to move forward with . . . .""

Figure 3D:
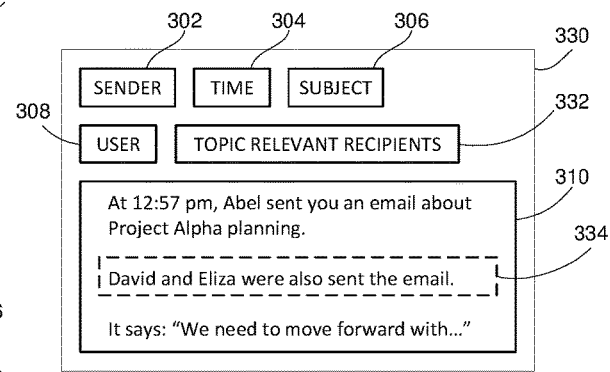

Email narration program 200 populates the narration script with recipient(s) assigned high importance for the narration population group "topic relevant recipients" (step 278). In some embodiments, recipients assigned high importance in step 254 may populate the narration script as topic relevant recipients. In some embodiments, the narration script mentions the importance of the recipients listed. In other embodiments, the recipients assigned high importance are listed in the narration script along with the rest of narration script. FIG. 3D depicts an example screenshot of a narration script populated with recipient(s) assigned high importance for the narration population group "topic relevant recipients."

FIG. 3D depicts screenshot 330 of an example narration script that is populated by the narration population group "topic relevant recipients," in accordance to an embodiment. Screenshot 330 includes message sender display 302, message time display 304, message subject display 306, message user display 308, narration population group display 332, and created narration script display 310. Created narration script display 310 includes narration population group insert 334. Narration population group display 332 displays the narration group(s) that are included in the created narration script. In screenshot 330, the narration population group "topic relevant recipients" is included in the created narration script. Created narration script display 310 includes narration population group insert 334, which lists the recipient(s), recipient role(s), and/or collective name(s) that was assigned high importance by email narration program 200. In screenshot 330, narration population group insert 334 lists recipients assigned high importance for the narration population group "topic relevant recipients."

To illustrate the functionality described above with respect to FIGS. 1, 2A-F, and 3D, in one specific example, a user of email access device 104, Frank, selects an email message Frank received from work using email access UI 105. The email message was sent by Abel at 12:57 pm with the subject line: Project Alpha planning. Also receiving the email was Baker, Charlie, David, and Eliza. David and Eliza were often included in emails regarding Project Alpha. Email narration program 200 assigns high importance to David and Eliza as "topic relevant recipients." Email narration program 200 creates a narration script saying "At 12:57 pm, Abel sent you an email about Project Alpha planning. It says: "We need to move forward with . . . ."" Email narration program 200 populates the narration script with a line regarding the topic relevant recipients. The updated narration script would read: "At 12:57 pm, Abel sent you an email about Project Alpha planning. David and Eliza were also sent the email. It says: "We need to move forward with . . . .""

Figure 3E:
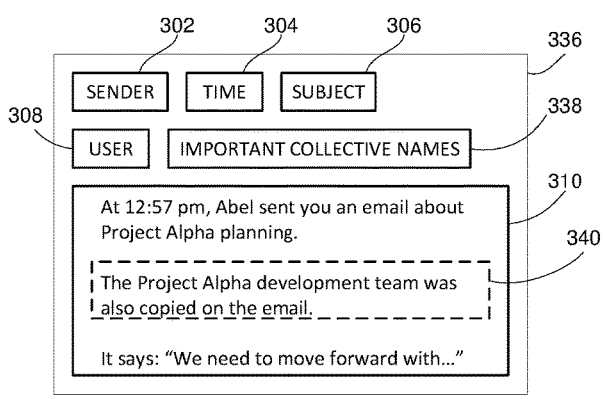

Email narration program 200 populates the narration script with recipient(s) assigned high importance for the narration population group "important collective names" (step 280). In some embodiments, recipients assigned high importance in step 266 may populate the narration script as important collective names. In some embodiments, the narration script mentions the importance of the collective names listed. In other embodiments, the collective names assigned high importance are listed in the narration script along with the rest of narration script. FIG. 3E depicts an example screenshot of a narration script populated with collective name(s) assigned high importance for the narration population group "important collective names."

FIG. 3E depicts screenshot 336 of an example narration script that is populated by the narration population group "important collective names," in accordance to an embodiment. Screenshot 336 includes message sender display 302, message time display 304, message subject display 306, message user display 308, narration population group display 338, and created narration script display 310. Created narration script display 310 includes narration population group insert 340. Narration population group display 338 displays the narration group(s) that are included in the created narration script. In screenshot 336, the narration population group "important collective names" is included in the created narration script. Created narration script display 310 includes narration population group insert 340, which lists the recipient(s), recipient role(s), and/or collective name(s) that was assigned high importance by email narration program 200. In screenshot 336, narration population group insert 340 lists recipients assigned high importance for the narration population group "important collective names."

To illustrate the functionality described above with respect to FIGS. 1, 2A-F, and 3E, in one specific example, a user of email access device 104, Frank, selects an email message Frank received from work using email access UI 105. The email message was sent by Abel at 12:57 pm with the subject line: Project Alpha planning. Also receiving the email was Baker, Charlie, David, and Eliza. Baker, Charlie, David, and Eliza were all members of the Project Alpha development team. Email narration program 200 assigns high importance to the Project Alpha development team as an "important collective name." Email narration program 200 creates a narration script saying "At 12:57 pm, Abel sent you an email about Project Alpha planning. It says: "We need to move forward with . . . ." Email narration program 200 populates the narration script with a line regarding the important collective name. The updated narration script would read: "At 12:57 pm, Abel sent you an email about Project Alpha planning. The Project Alpha development team was also copied on the email. It says: "We need to move forward with . . . ."

In an example combining embodiments depicted in FIGS. 3A, 3B, and 3E and using elements of the previous examples in those figures, a user of email access device 104, Frank, selects an email message that was sent by Abel at 12:57 pm with the subject line: Project Alpha planning. Also receiving the email was Baker, Charlie, David, and Eliza. Email narration program 200 assigned high importance to Baker as "important recipients." Email narration program 200 assigned high importance to Charlie as a "non-typical recipient." David and Eliza were members of the Project Alpha development team. Email narration program 200 assigned high importance to the Project Alpha development team as an "important collective name." Email narration program 200 populates the narration script and the updated narration script would read: "At 12:57 pm, Abel sent you an email about Project Alpha planning. Baker and the Project Alpha development team were also copied on the email. This time Charlie was copied on the email. It says: "We need to move forward with . . . ."

Email narration program 200 plays the completed narration script (step 282). In some embodiments, email narration program 200 is read aloud to the user by a device, such as email access device 104 of FIG. 1. The narration may include a description of when the message was sent, by whom, the subject line, the content of the message, and the important recipient(s), recipient role(s), and collective name(s). In other embodiments, email narration program 200 displays the narration script for user on the user's device, such as email access device 104.

Figure 4:
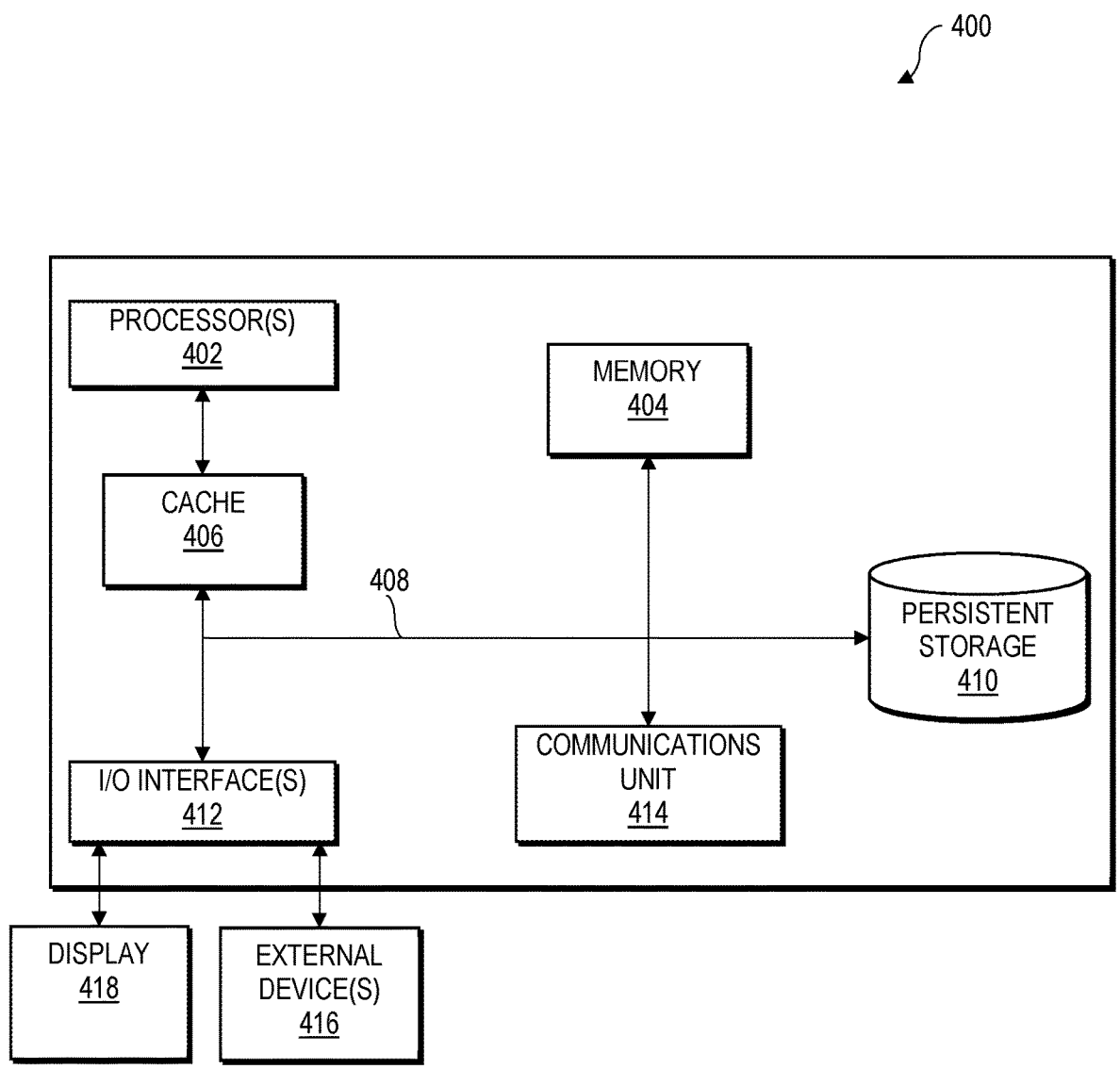
FIG. 4 is a block diagram of components of a computing device executing operations for narrating an email message based on the significance of the recipients on the message, in accordance with an embodiment of the present invention.

FIG. 4 is a block diagram of components of a computing device, generally designated 400, in accordance with an embodiment of the present invention. In one embodiment, computing system 400 is representative of email narration server 108 within computing environment 100, in which case email narration server 108 includes email narration program 200.

It should be appreciated that FIG. 4 provides only an illustration of one implementation and does not imply any limitations with regard to the environments in which different embodiments may be implemented. Many modifications to the depicted environment may be made.

Computing system 400 includes processor(s) 402, cache 406, memory 404, persistent storage 410, input/output (I/O) interface(s) 412, communications unit 414, and communications fabric 408. Communications fabric 408 provides communications between cache 406, memory 404, persistent storage 410, communications unit 414, and input/output (I/O) interface(s) 412. Communications fabric 408 can be implemented with any architecture designed for passing data and/or control information between processors (such as microprocessors, communications, and network processors, etc.), system memory, peripheral devices, and any other hardware components within a system. For example, communications fabric 408 can be implemented with one or more buses or a crossbar switch.

Memory 404 and persistent storage 410 are computer readable storage media. In this embodiment, memory 404 includes random access memory (RAM). In general, memory 404 can include any suitable volatile or non-volatile computer readable storage media. Cache 406 is a fast memory that enhances the performance of processor(s) 402 by holding recently accessed data, and data near recently accessed data, from memory 404.

Program instructions and data used to practice embodiments of the present invention may be stored in persistent storage 410 and in memory 404 for execution by one or more of the respective processor(s) 402 via cache 406. In an embodiment, persistent storage 410 includes a magnetic hard disk drive. Alternatively, or in addition to a magnetic hard disk drive, persistent storage 410 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 410 may also be removable. For example, a removable hard drive may be used for persistent storage 410. Other examples include optical and magnetic disks, thumb drives, and smart cards that are inserted into a drive for transfer onto another computer readable storage medium that is also part of persistent storage 410.

Communications unit 414, in these examples, provides for communications with other data processing systems or devices. In these examples, communications unit 414 includes one or more network interface cards. Communications unit 414 may provide communications through the use of either or both physical and wireless communications links. Program instructions and data used to practice embodiments of the present invention may be downloaded to persistent storage 410 through communications unit 414.

I/O interface(s) 412 allows for input and output of data with other devices that may be connected to computer system 400. For example, I/O interface(s) 412 may provide a connection to external device(s) 416 such as a keyboard, keypad, a touch screen, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 410 via I/O interface(s) 412. I/O interface(s) 412 also connect to display 418.

Display 418 provides a mechanism to display or present data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, a list of alternatives such as "at least one of A, B, and C" should be interpreted to mean "at least one A, at least one B, at least one C, or any combination of A, B, and C."

Additionally, the phrase "based on" should be interpreted to mean "based, at least in part, on."

The term "exemplary" means of or relating to an example and should not be construed to indicate that any particular embodiment is preferred relative to any other embodiment.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
identifying an email message;
identifying a plurality of recipients of the email message;
identifying a client recipient from the plurality of recipients;
selecting a first recipient from the plurality of recipients, wherein the first recipient is a recipient other than the client recipient;
identifying messages in an email repository, wherein the email repository is associated with the client recipient;
determining, from among the identified messages, a first count of messages, wherein the first recipient is a party to the first count of messages;
identifying an important recipient threshold, wherein the important recipient threshold represents a threshold count of messages including the plurality of recipients;
in response to determining the first count of messages exceeds the important recipient threshold, assigning a high importance recipient rating to the first recipient;
creating a narration script, wherein the narration script is associated with the email message; and
in response to identifying the first recipient as having the high importance recipient rating, populating the narration script with a name of the first recipient such that the name of the first recipient will be read when the narration script is recited.

2. The method of claim 1, further comprising:
selecting a second recipient from the plurality of recipients, wherein the second recipient is a recipient other than the client recipient and the first recipient;
determining, from among the identified messages, a second count of messages, wherein the second recipient is a party to the second count of messages;
in response to determining the second count of messages does not exceed the important recipient threshold, assigning a low importance recipient rating to the second recipient; and
in response to identifying the second recipient as having the low importance recipient rating, excluding a name of the second recipient from the narration script such that the name of the second recipient will not be read when the narration script is recited unless the name of the second recipient is read based on another type of threshold.

3. The method of claim 2, further comprising:
identifying a non-typical recipient threshold, wherein the non-typical recipient threshold represents a threshold count of messages including the plurality of recipients having the low importance recipient rating;
in response to determining the second count of messages does not exceed the non-typical recipient threshold, assigning a high non-typical recipient rating to the second recipient; and
in response to identifying the second recipient as having the high non-typical recipient rating, populating the narration script with the name of the second recipient such that the name of the second recipient will be read when the narration script is recited.

4. The method of claim 2, further comprising:
determining a role of the second recipient from a directory, wherein the directory represents, at least in part, a relationship of the client recipient and a relationship of the second recipient to an organization when the client recipient and the second recipient are members of the organization;
determining a reporting structure within the directory, wherein the reporting structure represents, at least in part, a hierarchical relationship within the organization between the client recipient and the second recipient when the client recipient and the second recipient are members of the organization;
identifying an important recipient role threshold, wherein the important recipient role threshold represents a threshold count of degrees of separation within the reporting structure between the client recipient and one or more members of the organization;
in response to determining a degree of separation between a role of the client recipient and the role of the second recipient within the reporting structure does not exceed the important recipient role threshold, assigning a high importance recipient role rating to the role of the second recipient; and
in response to identifying the role of the second recipient as having the high importance recipient role rating, populating the narration script with the role of the second recipient such that the role of the second recipient will be read when the narration script is recited.

5. The method of claim 4, wherein the role of the second recipient populating the narration script is in relation to the role of the client recipient within the reporting structure.

6. The method of claim 2, further comprising:
extracting metadata from the email message, wherein the metadata includes information used for natural language processing;
executing pattern recognition computer program instructions on at least one of the metadata and data of the email message to determine a topic associated with the email message;
determining, from among the identified messages, a third count of messages, wherein the second recipient is a party to the third count of messages and wherein the third count of messages includes the topic;
identifying a topic relevant recipient threshold, wherein the topic relevant recipient threshold represents a threshold count of messages including the plurality of recipients and the topic;
in response to determining the third count of messages exceeds the topic relevant recipient threshold, assigning a high topic relevant recipient rating to the second recipient; and
in response to identifying the second recipient as having the high topic relevant recipient rating, populating the narration script with the name of the second recipient such that the name of the second recipient will be read when the narration script is recited.

7. The method of claim 6, further comprising:
determining a collective name associated with the topic by executing pattern recognition computer program instructions on at least one of the metadata and data of the email message;
determining a set of all individuals who are associated with the collective name from the identified messages;
executing pattern recognition computer program instructions on at least one of the metadata and data of the email message to identify a count of recipients who are individuals among the set of all individuals who are associated with the collective name;

identifying an important collective name threshold, wherein the important collective name threshold represents a threshold count of the plurality of recipients who are individuals among the set of all individuals who are associated with the collective name;

in response to determining the count of recipients who are individuals among the set of all individuals who are associated with the collective name exceeds the important collective name threshold, assigning a high important collective name rating to the collective name; and in response to identifying the collective name as having the high important collective name rating, populating the narration script with the collective name such that collective name will be read when the narration script is recited.

8. The method of claim 1, further comprising:

identifying phone calls from a phone call repository;

identifying calendar events from an event calendar; and determining, from among the identified phone calls and the identified calendar events, the first count of messages, wherein the first recipient is a party to the identified phone calls and the identified calendar events counted in the first count of messages.

9. A computer program product comprising:

a computer readable storage medium and program instructions stored on the computer readable storage medium, the program instructions comprising:

program instructions to identify an email message;

program instructions to identify a plurality of recipients of the email message;

program instructions to identify a client recipient from the plurality of recipients;

program instructions to select a first recipient from the plurality of recipients, wherein the first recipient is a recipient other than the client recipient;

program instructions to identify messages in an email repository, wherein the email repository is associated with the client recipient;

program instructions to determine, from among the identified messages, a first count of messages, wherein the first recipient is a party to the first count of messages;

program instructions to identify an important recipient threshold, wherein the important recipient threshold represents a threshold count of messages including the plurality of recipients;

in response to program instructions determining the first count of messages exceeds the important recipient threshold, execute program instructions to assign a high importance recipient rating to the first recipient;

program instructions to create a narration script, wherein the narration script is associated with the email message; and in response to program instructions identifying the first recipient as having the high importance recipient rating, execute program instructions to populate the narration script with a name of the first recipient such that the name of the first recipient will be read when the narration script is recited.

10. The computer program product of claim 9, further comprising:

program instructions to select a second recipient from the plurality of recipients, wherein the second recipient is a recipient other than the client recipient and the first recipient;

program instructions to determine, from among the identified messages, a second count of messages, wherein the second recipient is a party to the second count of messages;

in response to program instructions determining the second count of messages does not exceed the important recipient threshold, execute program instructions to assign a low importance recipient rating to the second recipient; and in response to program instructions identifying the second recipient as having the low importance recipient rating, execute program instructions to exclude a name of the second recipient from the narration script such that the name of the second recipient will not be read when the narration script is recited unless the name of the second recipient is read based on another type of threshold.

11. The computer program product of claim 10, further comprising:

program instructions to identify a non-typical recipient threshold, wherein the non-typical recipient threshold represents a threshold count of messages including the plurality of recipients having the low importance recipient rating;

in response to program instructions determining the second count of messages does not exceed the non-typical recipient threshold, execute program instructions to assign a high non-typical recipient rating to the second recipient; and in response to program instructions identifying the second recipient as having the high non-typical recipient rating, execute program instructions to populate the narration script with the name of the second recipient such that the name of the second recipient will be read when the narration script is recited.

12. The computer program product of claim 10, further comprising:

program instructions to determine a role of the second recipient from a directory, wherein the directory represents, at least in part, a relationship of the client recipient and a relationship of the second recipient to an organization when the client recipient and the second recipient are members of the organization;

program instructions to determine a reporting structure within the directory, wherein the reporting structure represents, at least in part, a hierarchical relationship within the organization between the client recipient and the second recipient when the client recipient and the second recipient are members of the organization;

program instructions to identify an important recipient role threshold, wherein the important recipient role threshold represents a threshold count of degrees of separation within the reporting structure between the client recipient and one or more members of the organization;

in response to program instructions determining a degree of separation between a role of the client recipient and the role of the second recipient within the reporting structure does not exceed the important recipient role threshold, execute program instructions to assign a high importance recipient role rating to the role of the second recipient; and in response to program instructions identifying the role of the second recipient as having the high importance recipient role rating, execute program instructions to populate the narration script with the role of the second recipient such that the role of the second recipient will be read when the narration script is recited.

13. The computer program product of claim 10, further comprising:
program instructions to extract metadata from the email message, wherein the metadata includes information used for natural language processing;
program instructions to execute pattern recognition computer program instructions on at least one of the metadata and data of the email message to determine a topic associated with the email message;
program instructions to determine, from among the identified messages, a third count of messages, wherein the second recipient is a party to the third count of messages and wherein the third count of messages includes the topic;
program instructions to identify a topic relevant recipient threshold, wherein the topic relevant recipient threshold represents a threshold count of messages including the plurality of recipients and the topic;
in response to program instructions determining the third count of messages exceeds the topic relevant recipient threshold, execute program instructions to assign a high topic relevant recipient rating to the second recipient; and
in response to program instructions identifying the second recipient as having the high topic relevant recipient rating, execute program instructions to populate the narration script with the name of the second recipient such that the name of the second recipient will be read when the narration script is recited.

14. The computer program product of claim 13, further comprising:
program instructions to determine a collective name associated with the topic by executing pattern recognition computer program instructions on at least one of the metadata and data of the email message;
program instructions to determine a set of all individuals who are associated with the collective name from the identified messages;
program instructions to execute pattern recognition computer program instructions on at least one of the metadata and data of the email message to identify a count of recipients who are individuals among the set of all individuals who are associated with the collective name;
program instructions to identify an important collective name threshold, wherein the important collective name threshold represents a threshold count of the plurality of recipients who are individuals among the set of all individuals who are associated with the collective name;
in response to program instructions determining the count of recipients who are individuals among the set of all individuals who are associated with the collective name exceeds the important collective name threshold, execute program instructions to assign a high important collective name rating to the collective name; and
in response to program instructions identifying the collective name as having the high important collective name rating, execute program instructions to populate the narration script with the collective name such that collective name will be read when the narration script is recited.

15. A computer system comprising:
one or more computer processors;
one or more computer readable storage media;
program instructions stored on the one or more computer readable storage media for execution by at least one of the one or more processors, the program instructions comprising:
program instructions to identify an email message;
program instructions to identify a plurality of recipients of the email message;
program instructions to identify a client recipient from the plurality of recipients;
program instructions to select a first recipient from the plurality of recipients, wherein the first recipient is a recipient other than the client recipient;
program instructions to identify messages in an email repository, wherein the email repository is associated with the client recipient;
program instructions to determine, from among the identified messages, a first count of messages, wherein the first recipient is a party to the first count of messages;
program instructions to identify an important recipient threshold, wherein the important recipient threshold represents a threshold count of messages including the plurality of recipients;
in response to program instructions determining the first count of messages exceeds the important recipient threshold, execute program instructions to assign a high importance recipient rating to the first recipient;
program instructions to create a narration script, wherein the narration script is associated with the email message; and
in response to program instructions identifying the first recipient as having the high importance recipient rating, execute program instructions to populate the narration script with a name of the first recipient such that the name of the first recipient will be read when the narration script is recited.

16. The computer system of claim 15, further comprising:
program instructions to select a second recipient from the plurality of recipients, wherein the second recipient is a recipient other than the client recipient and the first recipient;
program instructions to determine, from among the identified messages, a second count of messages, wherein the second recipient is a party to the second count of messages;
in response to program instructions determining the second count of messages does not exceed the important recipient threshold, execute program instructions to assign a low importance recipient rating to the second recipient; and
in response to program instructions identifying the second recipient as having the low importance recipient rating, execute program instructions to exclude a name of the second recipient from the narration script such that the name of the second recipient will not be read when the narration script is recited unless the name of the second recipient is read based on another type of threshold.

17. The computer system of claim 16, further comprising:
program instructions to identify a non-typical recipient threshold, wherein the non-typical recipient threshold represents a threshold count of messages including the plurality of recipients having the low importance recipient rating;
in response to program instructions determining the second count of messages does not exceed the non-typical recipient threshold, execute program instructions to assign a high non-typical recipient rating to the second recipient; and in response to program instructions identifying the second recipient as having the high non-typical recipient rating, execute program instructions to populate the narration script with the name of the second recipient such that the name of the second recipient will be read when the narration script is recited.

18. The computer system of claim 16, further comprising:

program instructions to determine a role of the second recipient from a directory, wherein the directory represents, at least in part, a relationship of the client recipient and a relationship of the second recipient to an organization when the client recipient and the second recipient are members of the organization;

program instructions to determine a reporting structure within the directory, wherein the reporting structure represents, at least in part, a hierarchical relationship within the organization between the client recipient and the second recipient when the client recipient and the second recipient are members of the organization;

program instructions to identify an important recipient role threshold, wherein the important recipient role threshold represents a threshold count of degrees of separation within the reporting structure between the client recipient and one or more members of the organization;

in response to program instructions determining a degree of separation between a role of the client recipient and the role of the second recipient within the reporting structure does not exceed the important recipient role threshold, execute program instructions to assign a high importance recipient role rating to the role of the second recipient; and in response to program instructions identifying the role of the second recipient as having the high importance recipient role rating, execute program instructions to populate the narration script with the role of the second recipient such that the role of the second recipient will be read when the narration script is recited.

19. The computer system of claim 16, further comprising:

program instructions to extract metadata from the email message, wherein the metadata includes information used for natural language processing;

program instructions to execute pattern recognition computer program instructions on at least one of the metadata and data of the email message to determine a topic associated with the email message;

program instructions to determine, from among the identified messages, a third count of messages, wherein the second recipient is a party to the third count of messages and wherein the third count of messages includes the topic;

program instructions to identify a topic relevant recipient threshold, wherein the topic relevant recipient threshold represents a threshold count of messages including the plurality of recipients and the topic;

in response to program instructions determining the third count of messages exceeds the topic relevant recipient threshold, execute program instructions to assign a high topic relevant recipient rating to the second recipient; and in response to program instructions identifying the second recipient as having the high topic relevant recipient rating, execute program instructions to populate the narration script with the name of the second recipient such that the name of the second recipient will be read when the narration script is recited.

20. The computer system of claim 19, further comprising:

program instructions to determine a collective name associated with the topic by executing pattern recognition computer program instructions on at least one of the metadata and data of the email message;

program instructions to determine a set of all individuals who are associated with the collective name from the identified messages;

program instructions to execute pattern recognition computer program instructions on at least one of the metadata and data of the email message to identify a count of recipients who are individuals among the set of all individuals who are associated with the collective name;

program instructions to identify an important collective name threshold, wherein the important collective name threshold represents a threshold count of the plurality of recipients who are individuals among the set of all individuals who are associated with the collective name;

in response to program instructions determining the count of recipients who are individuals among the set of all individuals who are associated with the collective name exceeds the important collective name threshold, execute program instructions to assign a high important collective name rating to the collective name; and in response to program instructions identifying the collective name as having the high important collective name rating, execute program instructions to populate the narration script with the collective name such that collective name will be read when the narration script is recited.

* * * * *